US012573723B2

(12) United States Patent
Tajima et al.

(10) Patent No.: US 12,573,723 B2
(45) Date of Patent: Mar. 10, 2026

(54) BATTERY AND MANUFACTURING METHOD OF THE SAME

(71) Applicant: SEMICONDUCTOR ENERGY LABORATORY CO., LTD., Atsugi (JP)

(72) Inventors: Ryota Tajima, Kanagawa (JP); Kensuke Yoshizumi, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 9 days.

(21) Appl. No.: 17/666,142

(22) Filed: Feb. 7, 2022

(65) Prior Publication Data

US 2022/0166091 A1     May 26, 2022

Related U.S. Application Data

(63) Continuation of application No. 15/626,757, filed on Jun. 19, 2017, now abandoned.

(30) Foreign Application Priority Data

Jun. 22, 2016     (JP) ................................. 2016-123209

(51) Int. Cl.
*H01M 10/00*          (2006.01)
*H01M 50/105*        (2021.01)
(Continued)

(52) U.S. Cl.
CPC ....... *H01M 50/533* (2021.01); *H01M 50/105* (2021.01); *H01M 50/121* (2021.01);
(Continued)

(58) Field of Classification Search
CPC .. H01M 4/661; H01M 50/105; H01M 50/119; H01M 50/121; H01M 50/129;
(Continued)

(56) References Cited

U.S. PATENT DOCUMENTS 6,048,639 A       4/2000  Sonozaki et al.
6,145,280 A  *  11/2000  Daroux ............... H01M 50/133
                                                                     53/433

(Continued)

FOREIGN PATENT DOCUMENTS

CN          001224249 A       7/1999
CN          102629678 A       8/2012
(Continued)

OTHER PUBLICATIONS

Chinese Office Action (Application No. 201710437888.9) dated May 7, 2021.

(Continued)

*Primary Examiner* — Nicholas P D'Aniello

(74) *Attorney, Agent, or Firm* — NIXON PEABODY LLP; Jeffrey L. Costellia

(57)          ABSTRACT

To provide a battery capable of changing in shape safely. To provide a battery capable of repeatedly bent. The battery includes a first lead, a second lead, a first current collector, and a second current collector. The first current collector includes a first portion bonded to the first lead and a second portion coated with a first active material. The second current collector includes a third portion bonded to the second lead and a fourth portion coated with a second active material. The first lead, the second portion, and the fourth portion overlap with each other in a portion. The second lead, the second portion, and the fourth portion overlap with each other in a portion.

15 Claims, 27 Drawing Sheets

(51) Int. Cl.

| | |
|---|---|
| *H01M 50/121* | (2021.01) |
| *H01M 50/129* | (2021.01) |
| *H01M 50/133* | (2021.01) |
| *H01M 50/178* | (2021.01) |
| *H01M 50/533* | (2021.01) |
| *H01M 50/55* | (2021.01) |
| *H01M 50/557* | (2021.01) |
| *H01M 10/0585* | (2010.01) |

(52) U.S. Cl.
CPC ....... *H01M 50/129* (2021.01); *H01M 50/133* (2021.01); *H01M 50/178* (2021.01); *H01M 50/55* (2021.01); *H01M 50/557* (2021.01); *H01M 10/0585* (2013.01); *H01M 2220/30* (2013.01)

(58) Field of Classification Search
CPC ............. H01M 50/133; H01M 50/178; H01M 50/533; H01M 50/55; H01M 50/557; H01M 10/0525; H01M 10/0585; H01M 2220/30; H01M 50/528; H01M 50/586; H01M 50/591; H01M 2220/20; H01M 50/54; Y02E 60/10; Y02P 70/50
See application file for complete search history.

(56) References Cited

U.S. PATENT DOCUMENTS

| | | | |
|---|---|---|---|
| 6,641,027 | B2 | 11/2003 | O'Connell et al. |
| 7,332,242 | B2 | 2/2008 | Sato et al. |
| 8,313,857 | B2 | 11/2012 | Kim |
| 8,623,547 | B2 | 1/2014 | Kim |
| 8,785,030 | B2 | 7/2014 | Ueda |
| 9,136,508 | B2 | 9/2015 | Kim et al. |
| 9,299,970 | B2 * | 3/2016 | Kim ..................... H01M 10/052 |
| 9,385,366 | B2 | 7/2016 | Yamakaji et al. |
| 9,490,472 | B2 | 11/2016 | Nanba et al. |
| 9,786,872 | B2 | 10/2017 | Suh et al. |
| 9,859,535 | B2 | 1/2018 | Iseri et al. |
| 10,164,288 | B2 | 12/2018 | Rho et al. |
| 10,217,971 | B2 | 2/2019 | Takahashi et al. |
| 10,320,025 | B2 | 6/2019 | Hiroki et al. |
| 10,340,495 | B2 | 7/2019 | Miyake |
| 10,347,905 | B2 | 7/2019 | Nanba et al. |
| 10,522,811 | B2 | 12/2019 | Stalder et al. |
| 10,601,066 | B2 | 3/2020 | Takahashi et al. |
| 10,665,856 | B2 | 5/2020 | Yanagihara et al. |
| 11,108,038 | B2 | 8/2021 | Yamakaji et al. |
| 11,233,266 | B2 | 1/2022 | Takahashi et al. |
| 11,316,189 | B2 | 4/2022 | Hiroki et al. |
| 11,677,095 | B2 | 6/2023 | Hiroki et al. |
| 2003/0111512 | A1 | 6/2003 | O'Connell et al. |
| 2005/0238953 | A1 * | 10/2005 | Urso ................... H01M 10/623 |
| | | | 429/163 |
| 2007/0202399 | A1 | 8/2007 | Shin et al. |
| 2012/0040231 | A1 * | 2/2012 | Hagiwara .............. H01G 11/70 |
| | | | 29/25.03 |
| 2012/0202101 | A1 | 8/2012 | Ueda |
| 2012/0202105 | A1 | 8/2012 | Shinyashiki |
| 2013/0177787 | A1 | 7/2013 | Arima et al. |
| 2013/0252065 | A1 | 9/2013 | Ueda |
| 2013/0273405 | A1 | 10/2013 | Takahashi et al. |
| 2013/0284531 | A1 | 10/2013 | Oonuma et al. |
| 2014/0272538 | A1 | 9/2014 | Mitchell et al. |
| 2014/0352140 | A1 | 12/2014 | Tasaki et al. |
| 2015/0072204 | A1 * | 3/2015 | Kwon ................. H01M 50/538 |
| | | | 429/94 |
| 2015/0111088 | A1 | 4/2015 | Hiroki et al. |
| 2015/0155528 | A1 | 6/2015 | Takahashi et al. |
| 2015/0243962 | A1 | 8/2015 | Hiroki et al. |
| 2016/0093839 | A1 | 3/2016 | Iseri et al. |
| 2016/0240325 | A1 * | 8/2016 | Tajima .................. H01G 11/72 |
| 2016/0248053 | A1 | 8/2016 | Iseri et al. |
| 2016/0329546 | A1 | 11/2016 | Ham et al. |
| 2017/0373285 | A1 | 12/2017 | Tajima et al. |
| 2019/0288325 | A1 | 9/2019 | Hiroki et al. |
| 2022/0209280 | A1 | 6/2022 | Takahashi et al. |
| 2023/0378514 | A1 | 11/2023 | Hiroki et al. |

FOREIGN PATENT DOCUMENTS

| | | |
|---|---|---|
| CN | 103633294 A | 3/2014 |
| CN | 104078651 A | 10/2014 |
| CN | 104701565 A | 6/2015 |
| CN | 204577523 U | 8/2015 |
| CN | 105261779 A | 1/2016 |
| EP | 2017908 A | 1/2009 |
| EP | 2485298 A | 8/2012 |
| EP | 2674999 A | 12/2013 |
| EP | 2738831 A | 6/2014 |
| EP | 2975667 A | 1/2016 |
| EP | 3190651 A | 7/2017 |
| JP | 11-154495 A | 6/1999 |
| JP | 2000-173559 A | 6/2000 |
| JP | 2001-332241 A | 11/2001 |
| JP | 2002-298830 A | 10/2002 |
| JP | 2002-359006 A | 12/2002 |
| JP | 2003-109669 A | 4/2003 |
| JP | 2003-223880 A | 8/2003 |
| JP | 2005-243526 A | 9/2005 |
| JP | 2007-234466 A | 9/2007 |
| JP | 2007-305423 A | 11/2007 |
| JP | 2008-117614 A | 5/2008 |
| JP | 2009-026739 A | 2/2009 |
| JP | 2013-016321 A | 1/2013 |
| JP | 2013-145678 A | 7/2013 |
| JP | 2013-539586 | 10/2013 |
| JP | 2014-038736 A | 2/2014 |
| JP | 2015-115261 A | 6/2015 |
| JP | 2015-130332 A | 7/2015 |
| JP | 2015-187989 A | 10/2015 |
| JP | 2015-233004 A | 12/2015 |
| JP | 2016-027544 A | 2/2016 |
| JP | 2016-033901 A | 3/2016 |
| JP | 2016-072209 A | 5/2016 |
| JP | 2016-085962 A | 5/2016 |
| JP | 2021-192386 A | 12/2021 |
| KR | 2015-0046738 A | 4/2015 |
| WO | WO-2012/140709 | 10/2012 |
| WO | WO-2015/173687 | 11/2015 |
| WO | WO-2016/036184 | 3/2016 |

OTHER PUBLICATIONS

Chinese Office Action (Application No. 201710437888.9) dated Jan. 18, 2022.

Zhu.P et al., "A review of current collectors for lithium-ion batteries", Journal of Power Sources, Dec. 13, 2020, vol. 485, pp. 229321-1-229321-56, Elsevier.

\* cited by examiner

FIG. 12A
FIG. 12B
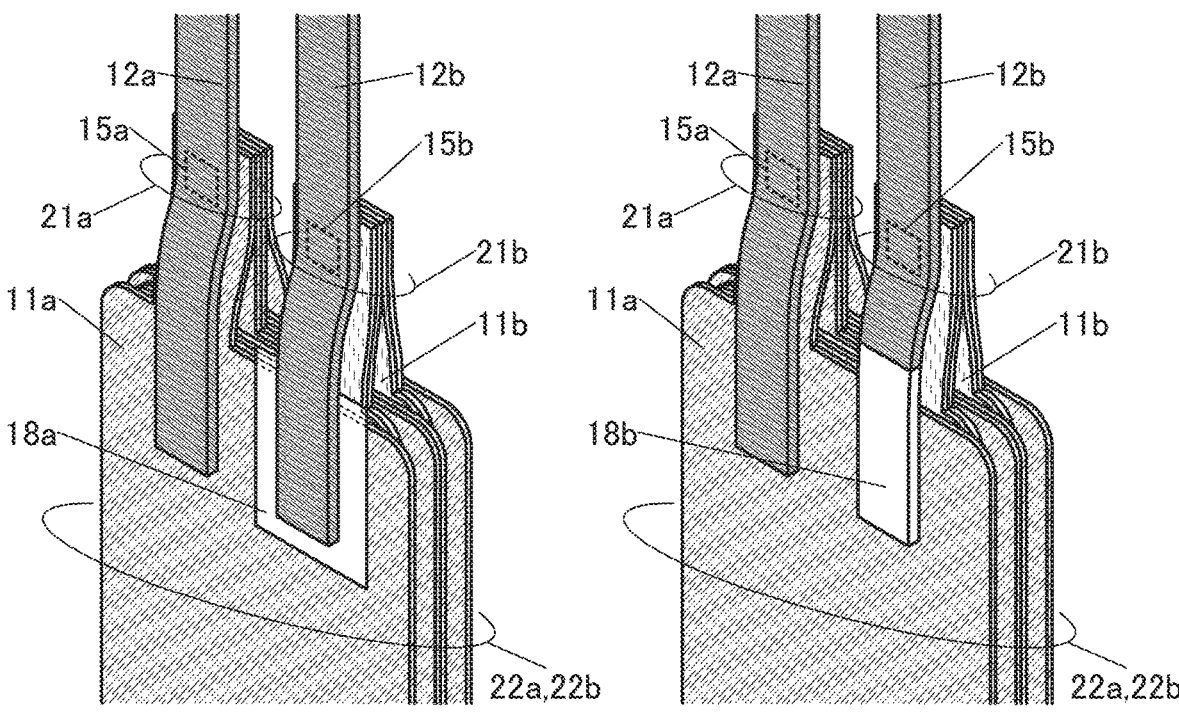
FIG. 12C
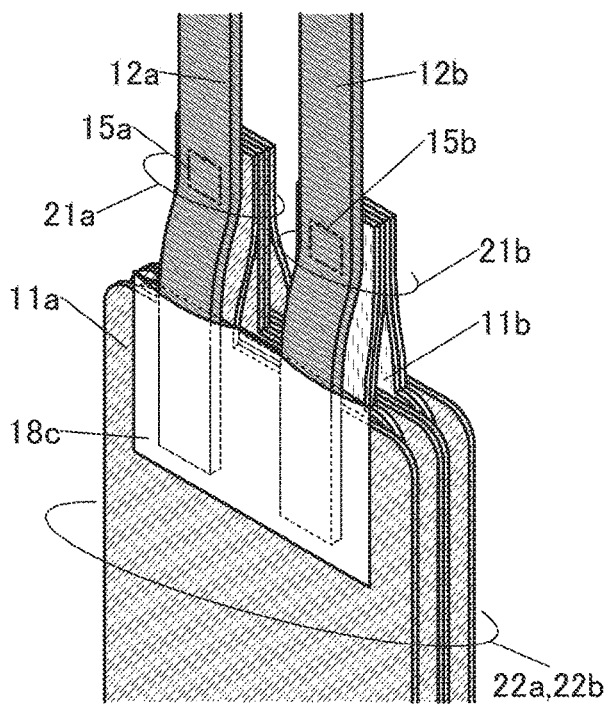

FIG. 15A          FIG. 15B          FIG. 15C
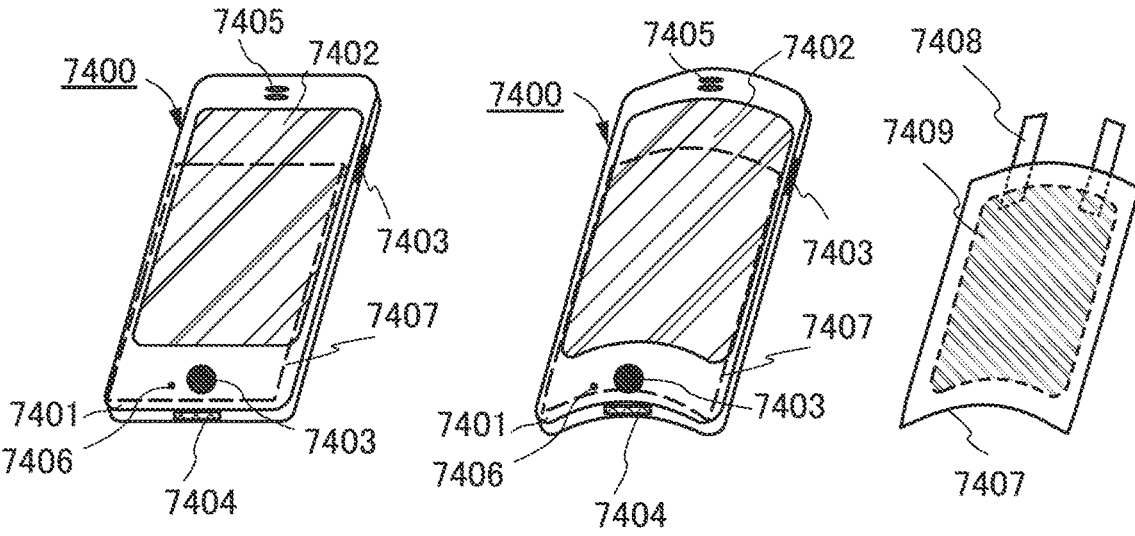
FIG. 15D
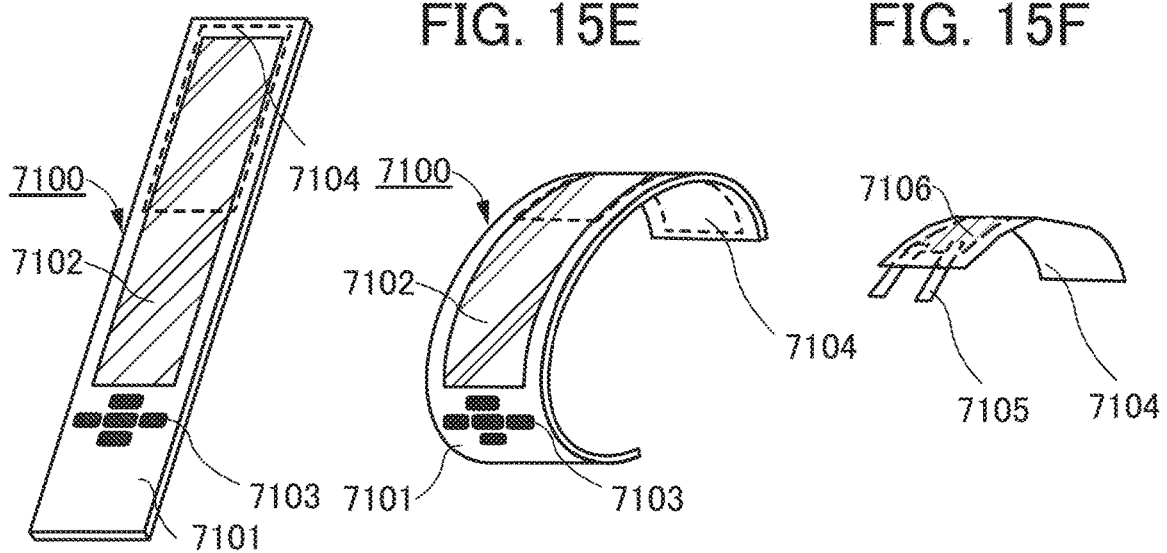
FIG. 15E          FIG. 15F
FIG. 15G          FIG. 15H
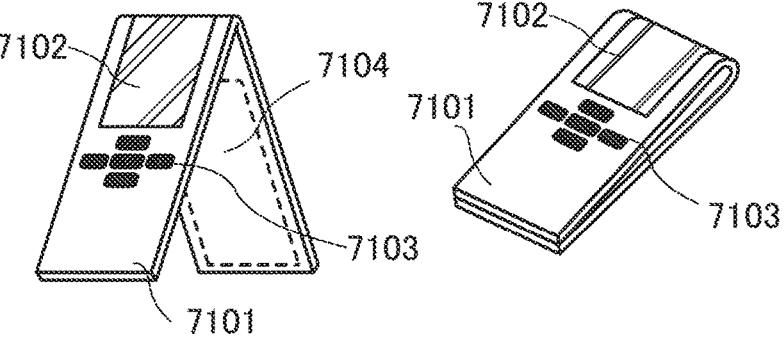

negative electrode current collector positive electrode current collector separator lead bonding portion lead bonding portion folded portion    exterior body  side seal        top seal    lead initial characteristics FIG. 24B    characteristics after bending and unbending

BATTERY AND MANUFACTURING METHOD OF THE SAME

BACKGROUND OF THE INVENTION

1. Field of the Invention

One embodiment of the present invention relates to a battery. One embodiment of the present invention relates to a bendable battery. One embodiment of the present invention relates to an inside structure of a battery.

Note that one embodiment of the present invention is not limited to the above technical field. Examples of the technical field of one embodiment of the present invention disclosed in this specification and the like include a semiconductor device, a display device, a light-emitting device, a power storage device, a memory device, an electronic device, a lighting device, an input device, an input/output device, a driving method thereof, and a manufacturing method thereof.

2. Description of the Related Art

Portable information terminal devices typified by smartphones and tablet terminals have been actively developed. Such electronic devices are required to be lightweight and compact, for example.

In recent years, wearable electronic devices (also referred to as wearable devices) especially have been under active development. Examples of wearable devices include a watch-type device worn on an arm, a glasses-like or a goggle-type device worn on a head, and a necklace-type device worn on a neck. For example, a watch-type device includes a small-sized display instead of a conventional watch dial to provide the user with various information in addition to the time. Such wearable devices have attracted attention to the medical use, the use for self-health management, or the like and have been increasingly put into practical use.

Mobile devices include secondary batteries that are capable of being repeatedly charged and discharged, in many cases. Wearable devices particularly include small-sized secondary batteries; thus, secondary batteries should be lightweight and compact and should be capable of being used for a long time.

Patent Document 1 discloses a highly flexible battery using a thin, pliant film-like material as an exterior body.

REFERENCE

Patent Document

[Patent Document 1] PCT International Publication No. 2012/140709

SUMMARY OF THE INVENTION

A battery occupies a large volume in a mobile device. When a battery is capable of changing in shape, for example, is bendable, the battery can be disposed in limited space in a housing, leading to downsizing of a device. Furthermore, in a conventional wearable device, it has been difficult to dispose a battery in a movable portion. When a battery is capable of repeatedly changing in shape, a device with a more sophisticated design can be obtained.

A secondary battery is generally covered with a hard exterior body even in the case where a film is used for the exterior body because a secondary battery might cause heat generation or catch fire when its exterior body is damaged. However, this structure has a problem in that change in shape of the secondary battery such as bending is not assumed and the place where the secondary battery is provided is limited in the case of being mounted on an electronic device.

In addition, there has been a safety problem with a conventional secondary battery. That is, there is a concern that, when a conventional secondary battery is bent repeatedly, a short circuit between electrodes in its exterior body, damage to the electrodes themselves, or the like may be caused as well as damage to the exterior body.

An object of one embodiment of the present invention is to provide a battery that is capable of changing in shape safely. An object of one embodiment of the present invention is to provide a battery that can be bent repeatedly.

An object of one embodiment of the present invention is to provide a battery with high capacity per unit volume. An object of one embodiment of the present invention is to provide a highly reliable battery.

Note that the descriptions of these objects do not disturb the existence of other objects. In one embodiment of the present invention, there is no need to achieve all the objects. Other objects can be derived from the description of the specification and the like.

One embodiment of the present invention is a battery including a first lead, a second lead, a first current collector, and a second current collector. The first current collector includes a first portion bonded to the first lead and a second portion coated with a first active material. The second current collector includes a third portion bonded to the second lead and a fourth portion coated with a second active material. The first lead, the second portion, and the fourth portion overlap with each other in a portion. The second lead, the second portion, and the fourth portion overlap with each other in a portion.

In the above embodiment, it is preferable that an insulating fixing member be included. In this case, it is preferable that the first lead, the first current collector, and the second current collector be fixed by the fixing member in a portion where the first lead, the first current collector, and the second current collector overlap with each other and the second lead, the first current collector, and the second current collector be fixed by the fixing member in a portion where the second lead, the first current collector, and the second current collector overlap with each other.

In the above embodiment, it is preferable that the first current collector be folded back between the first portion and the second portion and the first lead, the first portion, and the second portion overlap with each other in a portion. It is preferable that the second current collector be folded back between the third portion and the fourth portion and the second lead, the third portion, and the fourth portion overlap with each other in a portion.

In the above embodiment, it is preferable that the first current collector be folded back such that a surface of the first current collector that is bonded to the first lead faces outward and the second current collector be folded back such that a surface of the second current collector that is bonded to the second lead faces outward.

In the above embodiment, it is preferable that a first insulating member and a second insulating member be included. In this case, it is preferable that the first portion and the second portion overlap with each other with the first insulating member positioned therebetween and the third portion and the fourth portion overlap with each other with the second insulating member positioned therebetween. In this case, it is preferable that the first insulating member cover the first portion and the first lead and the second insulating member cover the third portion and the second lead.

In the above embodiment, it is preferable that an exterior body be included. In this case, it is preferable that the exterior body have a film-like shape and be folded in two such that the first current collector and the second current collector are sandwiched by the exterior body. It is preferable that the exterior body include a pair of first seal portions by which the first current collector and the second current collector are sandwiched and a second seal portion overlapping with the first lead and the second lead. It is preferable that the exterior body have a wave shape almost parallel to the second seal portion in a region overlapping with the first current collector and the second current collector.

In the above embodiment, it is preferable that the first seal portions and the second seal portion be flat without the wave shape.

In the above embodiment, it is preferable that a distance between the first seal portion and an end portion of the first current collector or an end portion of the second current collector be 0.8 times or more and 3.0 times or less as large as a thickness of a stack including the first current collector and the second current collector.

In the above embodiment, it is preferable that a difference between a distance between the pair of first seal portions and a width of the first current collector or a width of the second current collector be 1.6 times or more and 6.0 times or less as large as a thickness of a stack including the first current collector and the second current collector.

Another embodiment of the present invention is a method for manufacturing a battery including a first current collector, a second current collector, a first lead, and a second lead. The method includes a first step of stacking the first current collector and the second current collector, a second step of bonding the first lead to the first current collector and bonding the second lead to the second current collector, and a third step of fixing the first current collector, the second current collector, the first lead, and the second lead by a fixing member.

In the above embodiment, it is preferable that a fourth step of folding back a part of the first current collector and a part of the second current collector be included between the second step and the third step.

In the above embodiment, it is preferable that a fifth step of stacking a plurality of first current collectors and a plurality of second current collectors be included instead of the first step. In the fifth step, the plurality of first current collectors are stacked such that positions of the plurality of first current collectors are shifted from each other, and the plurality of second current collectors are stacked such that positions of the plurality of second current collectors are shifted from each other.

According to one embodiment of the present invention, a battery that is capable of changing its shape safely can be provided. Furthermore, a battery that can be bent repeatedly can be provided. Furthermore, a battery with high capacity per unit volume can be provided. Furthermore, a highly reliable battery can be provided.

BRIEF DESCRIPTION OF THE DRAWINGS

FIGS. 12A to 12C illustrate a manufacturing method of a battery according to one embodiment.

FIGS. 13A, 13B1, 13B2, 13C, and 13D illustrate structure examples of a battery according to one embodiment.

FIGS. 15A to 15H illustrate electronic devices according to one embodiment.

FIGS. 24A and 24B show charge and discharge characteristics of a battery according to Example 2.

DETAILED DESCRIPTION OF THE INVENTION

Figure 1:
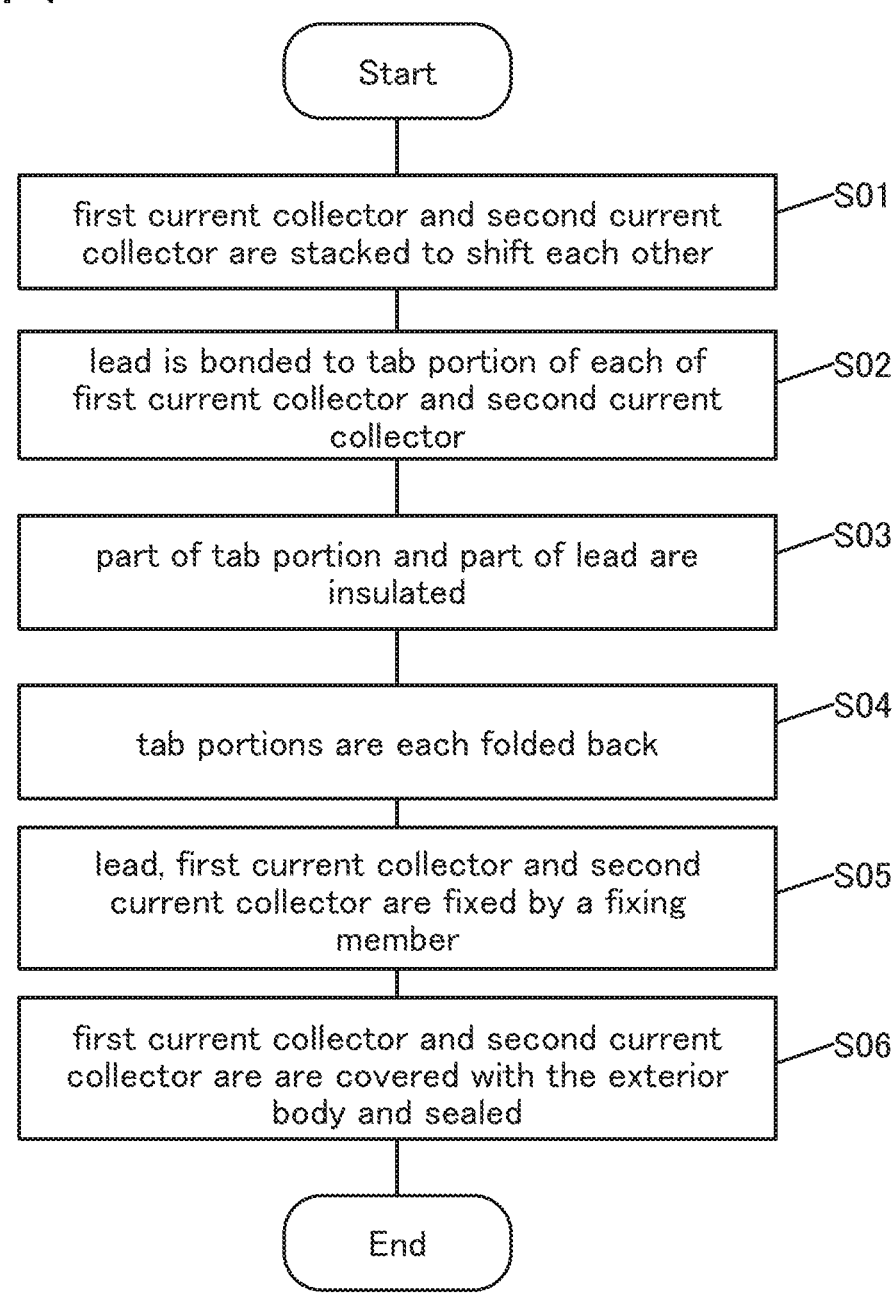
FIG. 1 is a flow chart of a manufacturing method of a battery according to one embodiment.

Embodiment will be described in detail with reference to the drawings. Note that the present invention is not limited to the following description. It will be readily appreciated by those skilled in the art that modes and details of the present invention can be modified in various ways without departing from the spirit and scope of the present invention. Thus, the present invention should not be construed as being limited to the description in the following embodiments.

Note that in structures of the present invention described below, the same portions or portions having similar functions are denoted by the same reference numerals in different drawings, and a description thereof is not repeated. Further, the same hatching pattern is applied to portions having similar functions, and the portions are not especially denoted by reference numerals in some cases.

Note that in each drawing described in this specification, the size, the layer thickness, or the region of each component is exaggerated for clarity in some cases. Therefore, the size, the layer thickness, or the region is not limited to the illustrated scale.

Note that in this specification and the like, ordinal numbers such as "first," "second," and the like are used in order to avoid confusion among components and do not limit the number.

Embodiment 1

In this embodiment, a structure example of a battery of one embodiment of the present invention and examples of a manufacturing method thereof will be described.

A battery of one embodiment of the present invention has a structure in which a first current collector and a second current collector are stacked in a film-like exterior body. The first current collector is one of a positive electrode current collector and a negative electrode current collector, and the second current collector is the other of the positive electrode current collector and the negative electrode current collector. The battery includes a pair of leads extending from the inside to the outside of the exterior body. The leads are bonded to the first current collector and the second current collector in the exterior body.

The first current collector and the second current collector each include a projected portion (also referred to as a tab portion) in a plan view. The tab portion includes a bonding portion to which the lead is bonded (also referred to as a first portion). The first current collector and the second current collector each include a portion coated with an active material or the like (also referred to as an electrode portion or a second portion).

In this specification and the like, a structure included in the exterior body is also referred to as an electrode stack, a stack, an electrode member, or the like. The electrode stack includes at least the first current collector and the second current collector. In some cases, the electrode stack includes the lead bonded to the first current collector and the lead bonded to the second current collector. The electrode stack may include a separator and an electrolyte solution between the first current collector and the second current collector. Note that the separator is not necessarily provided in the case where a solid electrolyte is used as the electrolyte solution.

The battery may include a plurality of first current collectors and a plurality of second current collectors. The larger the number of stacked current collectors is, the higher the capacity of the battery can be.

In one embodiment of the present invention, the lead, the second portion of the first current collector, and the second portion of the second current collector include a portion fixed by a fixing member. That is, the lead and the first current collector are not only bonded to each other at a portion overlapping with the tab portion but also fixed at a portion other than the tab portion. Similarly, the lead and the second current collector are fixed at a portion other than the tab portion.

Here, description is given of the case where the lead and the first current collector are fixed only at the tab portion and the lead and the second current collector are fixed only at the tab portion. When the shape of the battery is changed, for example, when the battery is bent repeatedly, the shapes of the first current collector and the second current collector are also changed repeatedly. In the first current collector and the second current collector, the tab portions are not coated with an active material layer and are thinner than the other portions. Furthermore, the widths of the tab portions are narrower than the widths of the second portions coated with active material layers. Therefore, the tab portions have lower mechanical strength than the other portions of the current collectors. In addition, portions at the root of the projected tab portions also have comparatively lower mechanical strength. Thus, by repeatedly changing the shape of the first current collector and the second current collector, a crack is likely to be formed in the tab portions of the first current collector and the second current collector and the portions at the root of the tab portions. In the worst case, fractures might be formed in the tab portions.

In one embodiment of the present invention, the first current collector or the second current collector is bonded to the lead through the tab portion, and, in addition, the lead and the second portion of the current collector are fixed by the fixing portion, achieving a structure in which the tab portion hardly changes in shape. Thus, a highly reliable battery can be obtained in which a problem is hardly caused by change in shape such as repeated bending.

It is preferable that the first current collector and the second current collector not be fixed to each other in a portion other than the portion fixed by the fixing member. In such a structure, when the battery is bent, the positions of the current collectors are shifted from each other while the portion fixed by the fixing member serves as a fulcrum, thereby relieving stress applied to the current collectors and preventing damage to the current collectors. Furthermore, in such a structure, the battery can be bent with weaker force.

In an example of a preferred structure, the tab portions of the first current collector and the second current collector are each folded back in a region between the bonding portion to which the lead is bonded and the electrode portion coated with the active material or the like. Furthermore, the parts of the tab portions including the bonding portions (the first portions), the parts of the leads, and the electrode portions (the second portions) of the first current collector and the second current collector are fixed by the fixing member.

It is preferable that each of the tab portions not be bent sharply but be folded back in a curved state. For example, the tab portion is preferably curved with a curvature radius that is 5 times or more, preferably 10 times or more, further preferably 20 times or more and less than 50 times as large as the thickness of the tab portion. If the curvature radius in the folded-back portion is less than 5 times as large as the thickness of the tab portion, a fracture might be formed in the tab portion, depending on a material of the current collector, when the tab portion is folded back. If the curvature radius is too large (e.g., 50 times or more), the thickness of the battery is increased.

In the case where the tab portion is folded back, there is a concern that an electrical short circuit may be caused by contact between the tab portion of one of the current collectors and the other current collector of opposite polarity. Thus, it is preferable that a surface of the part of the tab portion be insulated. Specifically, it is preferable that an insulating member be provided between the folded-back tab portion and the current collector. In this case, it is further preferable that the part of the tab portion be covered with the insulating member.

In the case where the tab portion is folded back, the tab portion is preferably folded back such that the surface bonded to the lead faces outward.

In another example of a preferred structure, the lead has a shape extending from the portion bonded to the tab portion to the electrode portion. The part of the lead and the electrode portion may be fixed by the fixing member in a region where the part of the lead and the electrode portion overlap with each other.

For the exterior body covering the first current collector and the second current collector, a film in the shape of a periodic wave in one direction is preferably used. The use of the wave shape for the exterior body relieves stress when the exterior body is bent because the form of the exterior body changes such that the period and amplitude of the wave are changed, preventing the exterior body from being damaged.

Furthermore, it is preferable that, in the exterior body, one side is folded such that the first current collector and the second current collector are sandwiched and portions (the other three sides) surrounding the first current collector and the second current collector are crimped to form seal portions. In this structure, the part of the seal portions that overlaps with the part of the lead can be referred to as a top seal portion, and the other parts can be referred to as side seal portions.

In this structure, in the case where space is provided between an end portion of the first current collector or the second current collector in the width direction (the direction parallel to the top seal portion) and the side seal portion, it is possible to inhibit rubbing of the first current collector or the second current collector against the exterior body at the time when the battery is bent repeatedly. For example, the distance between the first current collector or the second current collector and the side seal portion is preferably 0.8 times or more, further preferably 0.9 times or more, still further preferably 1.0 times or more and preferably 3 times or less, further preferably 2 times or less as large as the thickness of the stack in which the first current collector and the second current collector are stacked. Furthermore, for example, the difference between the distance between the pair of side seal portions and the width of the first current collector or the second current collector is preferably 1.6 times or more, further preferably 1.8 times or more, still further preferably 2.0 times or more and preferably 4 times or less as large as the thickness of the stack in which the first current collector and the second current collector are stacked.

The exterior body is preferably shaped in advance (or pre-shaped) to provide space between the end portion of the first current collector or the second current collector in the width direction and the side seal of the exterior body. The pre-shaping is performed as follows, for example: before the side seal is formed, the exterior body is shaped by pressing so that a gently curved shape is formed between the position overlapping with the end portion of the first current collector or the second current collector of the exterior body in the width direction and the portion in which the side seal is formed in a later step.

In the case where the pre-shaping is not performed, when the side seal is formed, for example, a sharply bent portion might be formed in the exterior body while the end portion of the first current collector or the second current collector in the width direction serves as a fulcrum. In contrast, in the case where the above-described pre-shaping is performed on the exterior body, such a sharply bent portion is hardly formed when the side seal is formed. Thus, it is possible to inhibit rubbing of the first current collector or the second current collector against the exterior body more effectively at the time when the battery is bent repeatedly, whereby the battery can be highly resistant to change in shape such as repeated bending.

A more specific example is described below with reference to drawings.

Manufacturing Method Example 1

A manufacturing method example of a battery of one embodiment of the present invention will be described below. FIG. 1 is a flow chart of a manufacturing method example of a battery described below.

[Current Collector]

Figures 2A, 2B:
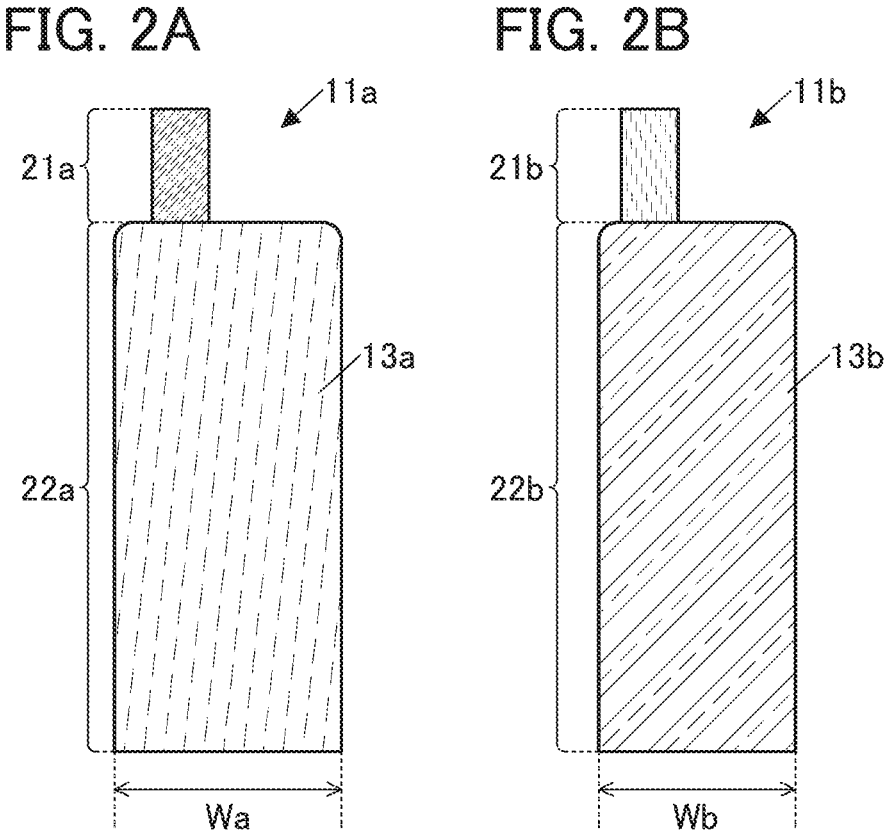
FIGS. 2A and 2B show current collectors according to one embodiment.

First, a current collector included in a battery of one embodiment of the present invention is described. FIGS. 2A and 2B are schematic top views of a current collector $11a$ and a current collector $11b$.

One of the current collector $11a$ and the current collector $11b$ serves as a positive electrode current collector, and the other of the current collector $11a$ and the current collector $11b$ serves as a negative electrode current collector. In this embodiment, the current collector $11a$ is used as a negative electrode current collector, and the current collector $11b$ is used as a positive electrode current collector.

The current collector $11a$ includes a tab portion $21a$ and an electrode portion $22a$ that serves as an electrode of the battery. The tab portion $21a$ is a projected portion of the current collector $11a$ and has a narrower width than the electrode portion $22a$. The electrode portion $22a$ is coated with an active material layer $13a$.

The current collector $11b$ includes a tab portion $21b$ and an electrode portion $22b$ that serves as an electrode of the battery. The tab portion $21b$ is a projected portion of the current collector $11b$ and has a narrower width than the electrode portion $22b$. The electrode portion $22b$ is coated with an active material layer $13b$.

It is preferable that only one surface of each of the current collectors $11a$ and $11b$ be coated with the active material layer $13a$ or the active material layer $13b$ and the other surface not be coated with the active material layer $13a$ or the active material layer $13b$.

It is preferable that a width Wa of the current collector $11a$ be different from a width Wb of the current collector $11b$. In FIGS. 2A and 2B, an example of the case where the width Wa of the current collector $11a$ is wider than the width Wb of the current collector $11b$ is shown.

The above is the description of the current collector.

Next, a method for manufacturing a battery is described with reference to the flow chart shown in FIG. 1 and FIGS. 3A to 3C, FIGS. 4A to 4D, FIGS. 5A to 5C, FIGS. 6A to 6C, FIGS. 7A and 7B, and FIGS. 8A and 8B.

[Step S01]

First, a plurality of current collectors $11a$ and a plurality of current collectors $11b$ are prepared and stacked such that their positions are shifted from each other in the length direction.

Figures 3A, 3B, 3C:
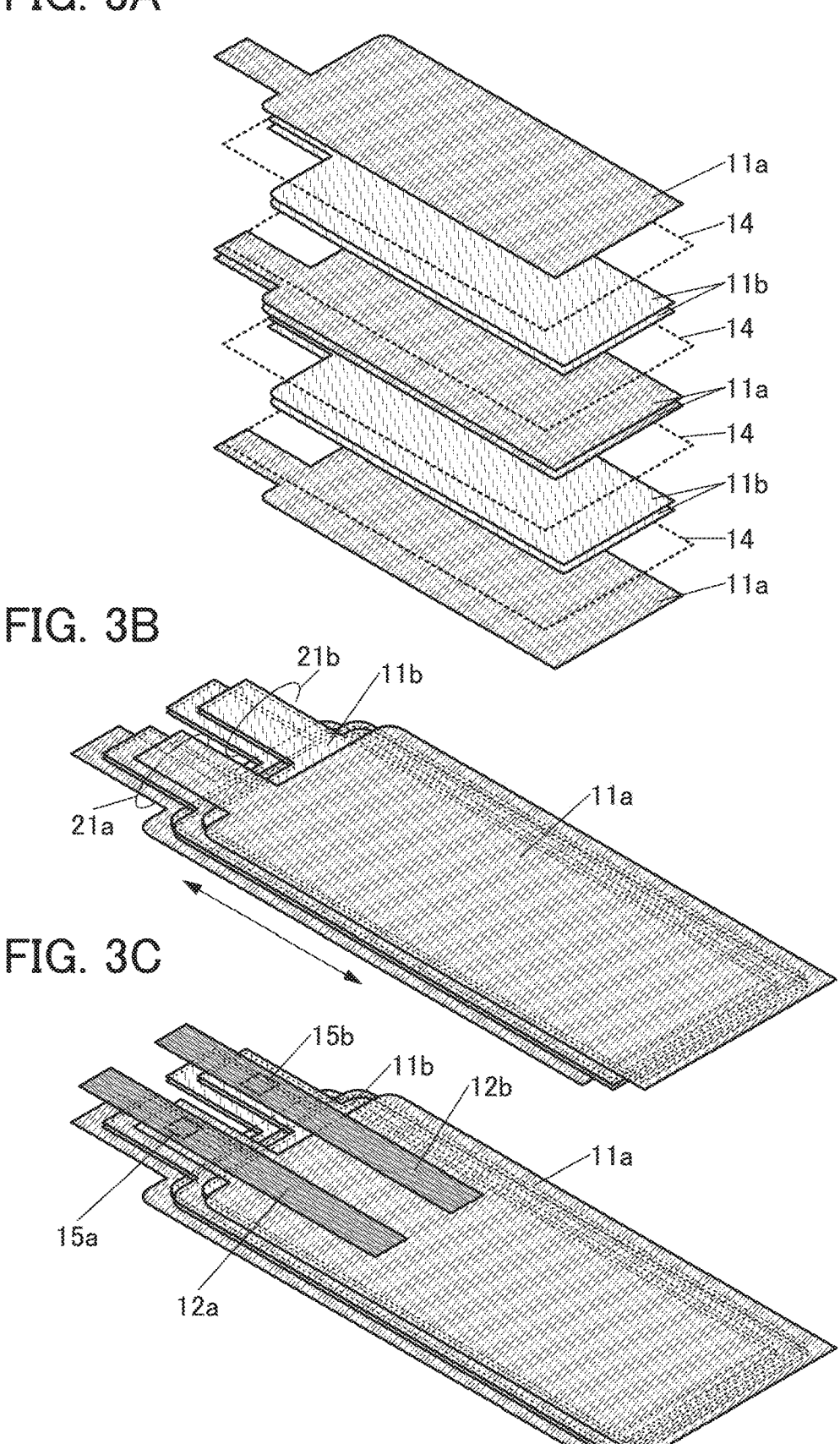
FIGS. 3A to 3C illustrate a manufacturing method of a battery according to one embodiment.

FIG. 3A is a schematic perspective view showing the stacked-layer structure. Note that the active material layer $13a$ and the active material layer $13b$ are not shown below for clarity.

In FIG. 3A, an example of the case where four current collectors $11a$ and four current collectors $11b$ are used is shown. Two current collectors $11a$ are provided on the outer side. On the inner side of the two current collectors $11a$, a pair of current collectors $11b$ and a pair of current collectors $11a$ are alternately provided. The pair of current collectors $11a$ is provided such that the surfaces of the pair of current collectors 11*a* that are opposite to the surfaces coated with the active material layers 13*a* (not shown) are in contact with each other. Similarly, the pair of current collectors 11*b* is provided such that the surfaces of the pair of current collectors 11*b* that are opposite to the surfaces coated with the active material layers 13*b* (not shown) are in contact with each other. That is, a structure is obtained in which the active material layer 13*a* and the active material layer 13*b* are positioned between the current collector 11*a* and the current collector 11*b* and an active material layer is not provided between two adjacent current collectors 11*a* and between two adjacent current collectors 11*b*. In the structure, the positions of the pair of current collectors 11*a* can be easily shifted from each other and the positions of the pair of current collectors 11*b* can be easily shifted from each other when the battery is bent. As described later, by sliding current collectors of the same polarity, stress applied to the current collectors themselves at the time of bending the battery can be reduced.

As shown in FIG. 3A, a separator 14 indicated by a dashed line may be provided between the current collector 11*a* and the current collector 11*b*. The separator 14 is preferably wider than the current collector 11*b*.

Figures 4A, 4B, 4C, 4D:
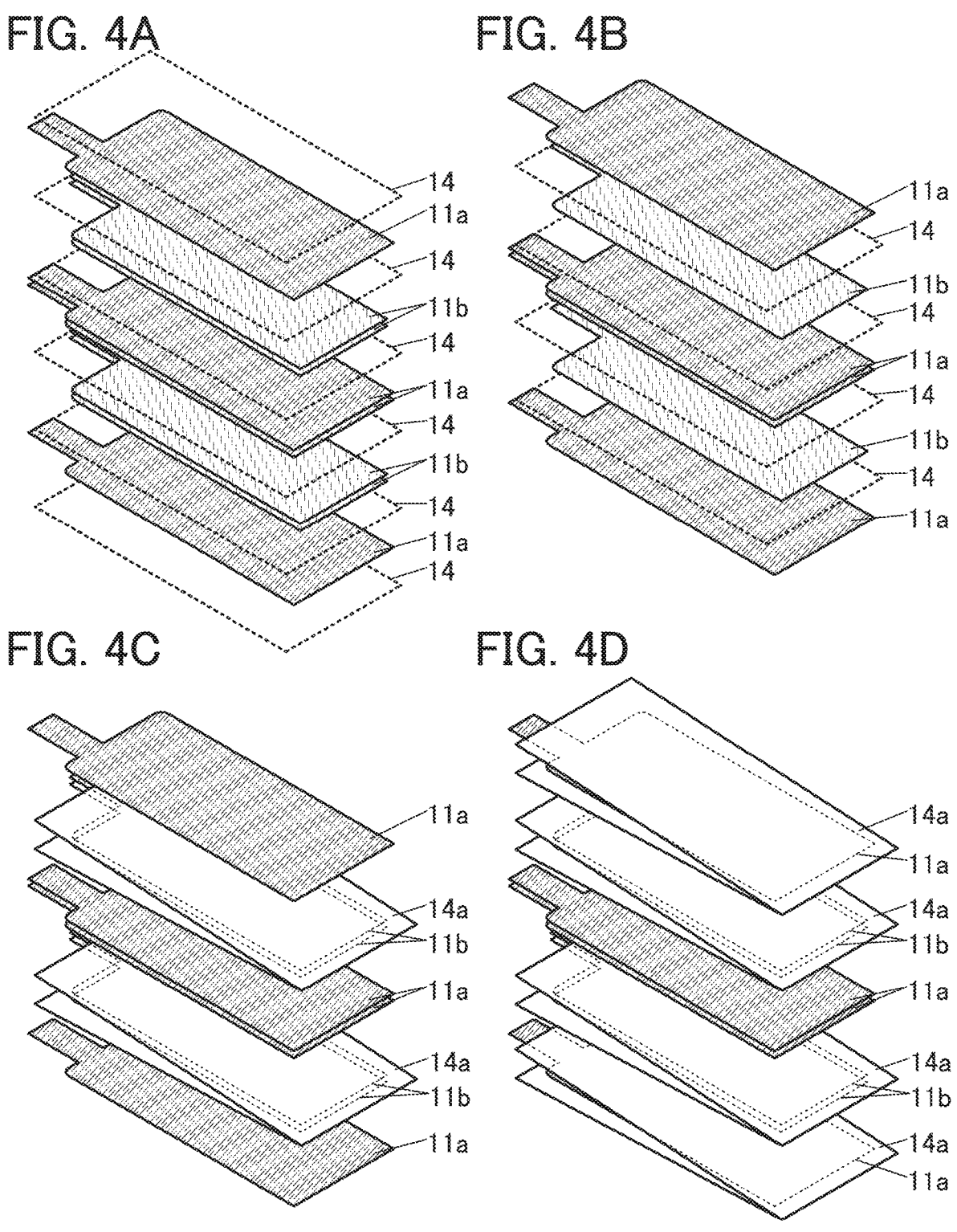
FIGS. 4A to 4D illustrate a manufacturing method of a battery according to one embodiment.

The stacked-layer structure is not limited to that shown in FIG. 3A. For example, the separator 14 may be provided on the outer side of each of the two outermost current collectors 11*a* as shown in FIG. 4A. Thus, the contact between an exterior body to be described later and the current collector 11*a* can be prevented, whereby damage to the exterior body due to rubbing of the exterior body and the current collector 11*a* against each other can be prevented. In this case, the separator 14 is preferably wider than the current collector 11*a*.

In FIG. 4B, an example in which one current collector 11*b* is positioned between two current collectors 11*a* is shown. In this example, it is preferable that opposite surfaces of the current collector 11*b* be coated with the active material layers 13*b*. Owing to such a structure, the battery can be thinned, and the capacity per unit volume and the capacity per unit weight can be increased. Since the battery can be thinned, the battery can be bent with weak force. Moreover, the pair of current collectors 11*a* is slid on each other easily because the pair of current collectors 11*a* is provided such that the surfaces of the pair of current collectors 11*a* that are opposite to the surfaces coated with the active material layers 13*a* (not shown) are in contact with each other. Thus, the battery can be bent with weaker force.

In FIG. 4C, a structure in which the pair of current collectors 11*b* is sandwiched by one separator 14*a* is shown. In this structure, the separator 14*a* is preferably shaped into a bag-like form by bonding the surrounding portion after the separator 14*a* is folded back. The use of the separator 14*a* having such a shape can inhibit an electrical short circuit between a positive electrode and a negative electrode even when the positions of the pair of current collectors 11*b* are shifted.

In FIG. 4D, each of two outermost current collectors 11*a* is also sandwiched by the separator 14*a* in comparison with FIG. 4C. Owing to such a structure, damage to the exterior body due to rubbing of the exterior body and the current collector 11*a* against each other can be prevented.

FIG. 3B shows a state where the current collectors 11*a* and the current collectors 11*b* overlap with each other. Note that the separator 14 is not shown below for clarity.

As shown in FIG. 3B, the current collectors 11*a* and the current collectors 11*b* are preferably stacked such that the relative positions of the current collectors 11*a* and the current collectors 11*b* are shifted in a direction in which the tab portions 21*a* or the tab portions 21*b* are provided (in a direction indicated by an arrow). In the case where the positions thereof are shifted in advance, positional shift that occurs at the time of folding the parts of the current collectors 11*a* and the parts of the current collectors 11*b* can be offset as described below. Specifically, the alignment of the plurality of electrode portions 22*a* and 22*b* can be uniform. Note that at this time, the plurality of current collectors 11*a* are preferably stacked such that a portion where the tab portions 21*a* of all of the current collectors 11*a* overlap with each other is formed. Similarly, the plurality of current collectors 11*b* are preferably stacked such that a portion where the tab portions 21*b* of all of the current collectors 11*b* overlap with each other is formed.

Note that as shown in FIG. 3B, the positions of the pair of current collectors 11*a* and the pair of current collectors 11*b* that are provided on the inner side are not necessarily shifted from each other.

[Step S02]

Then, as shown in FIG. 3C, a lead 12*a* and a lead 12*b* are bonded to the tab portion 21*a* of the current collector 11*a* and the tab portion 21*b* of the current collector 11*b*, respectively. The bonding can be performed by ultrasonic welding, for example.

The positions of the tab portions 21*a* of the current collectors 11*a* are shifted, and therefore, it is important that a bonding portion 15*a* where the tab portion 21*a* of the current collector 11*a* and the lead 12*a* are bonded to each other is formed so as to include areas of all of the tab portions 21*a* of the current collectors 11*a*. The same applies to a bonding portion 15*b* where the tab portion 21*b* of the current collector 11*b* and the lead 12*b* are bonded to each other.

Figures 5A, 5B, 5C:
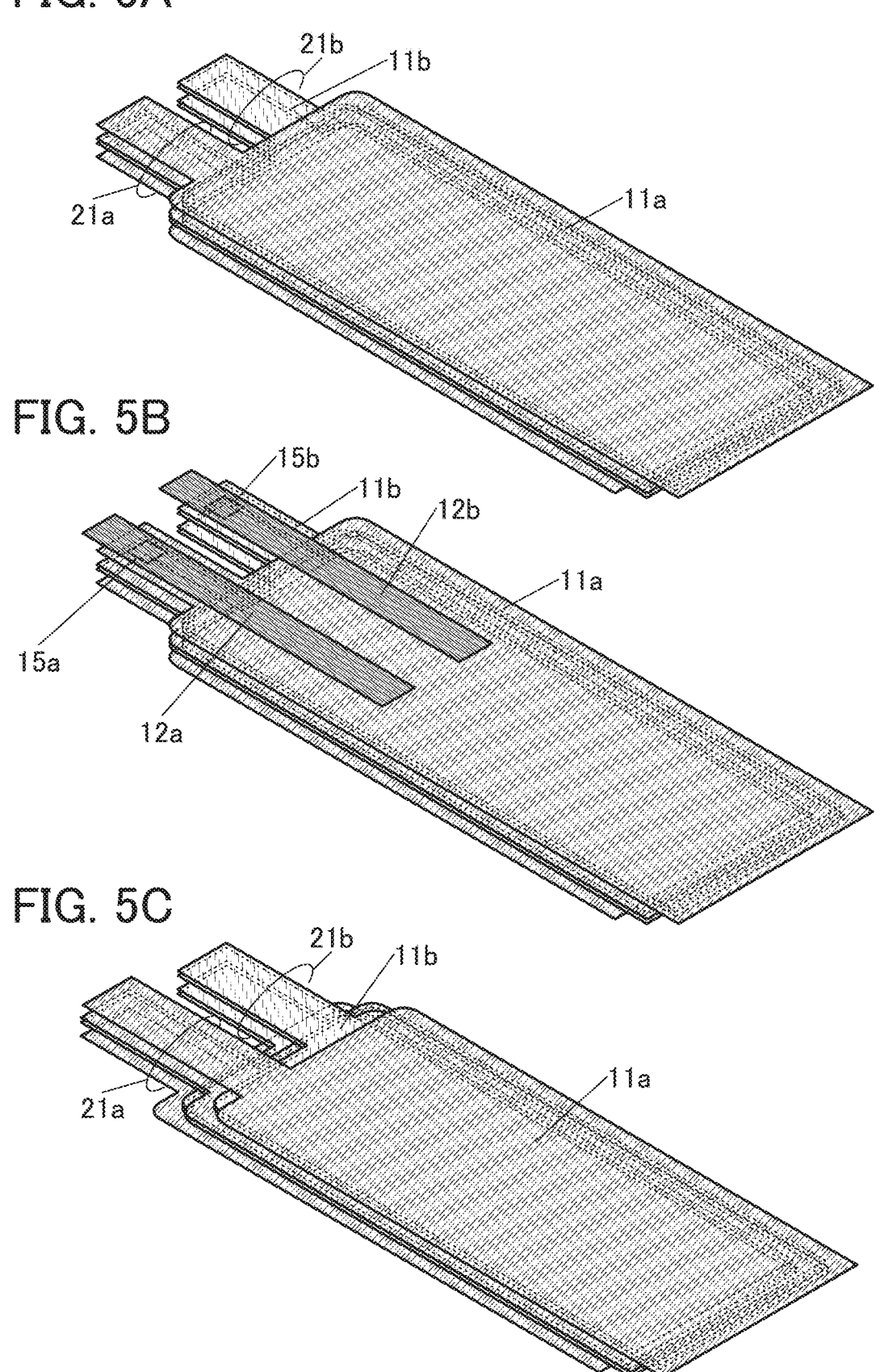
FIGS. 5A to 5C illustrate a manufacturing method of a battery according to one embodiment.

Note that in FIGS. 3A to 3C, the plurality of current collectors 11*a* and 11*b* have the same shape, but the plurality of current collectors 11*a* and 11*b* may differ in length. FIGS. 5A and 5B show an example of the case of using the current collectors 11*a* and the current collectors 11*b* that are longer in the length direction as they are closer to the bonding surface. Owing to such a structure, the positions of the tab portions 21*a* and the tab portions 21*b* are not shifted in the length direction, so that the lead 12*a* and the lead 12*b* are bonded to each other easily. In FIGS. 5A and 5B, the current collectors 11*a* and the current collectors 11*b* are equal in the length of the tab portion 21*a* or the tab portion 21*b* and differ in the length of the electrode portion 22*a* or the electrode portion 22*b*. As shown in FIG. 5C, the plurality of current collectors 11*a* and 11*b* may be equal in the length of the electrode portion 22*a* or the electrode portion 22*b* and differ in the length of the tab portion 21*a* or the tab portion 21*b*.

[Step S03]

Then, the part of the tab portion 21*a* and the part of the lead 12*a* are insulated, and the part of the tab portion 21*b* and the part of the lead 12*b* are insulated.

Figures 6A, 6B, 6C:
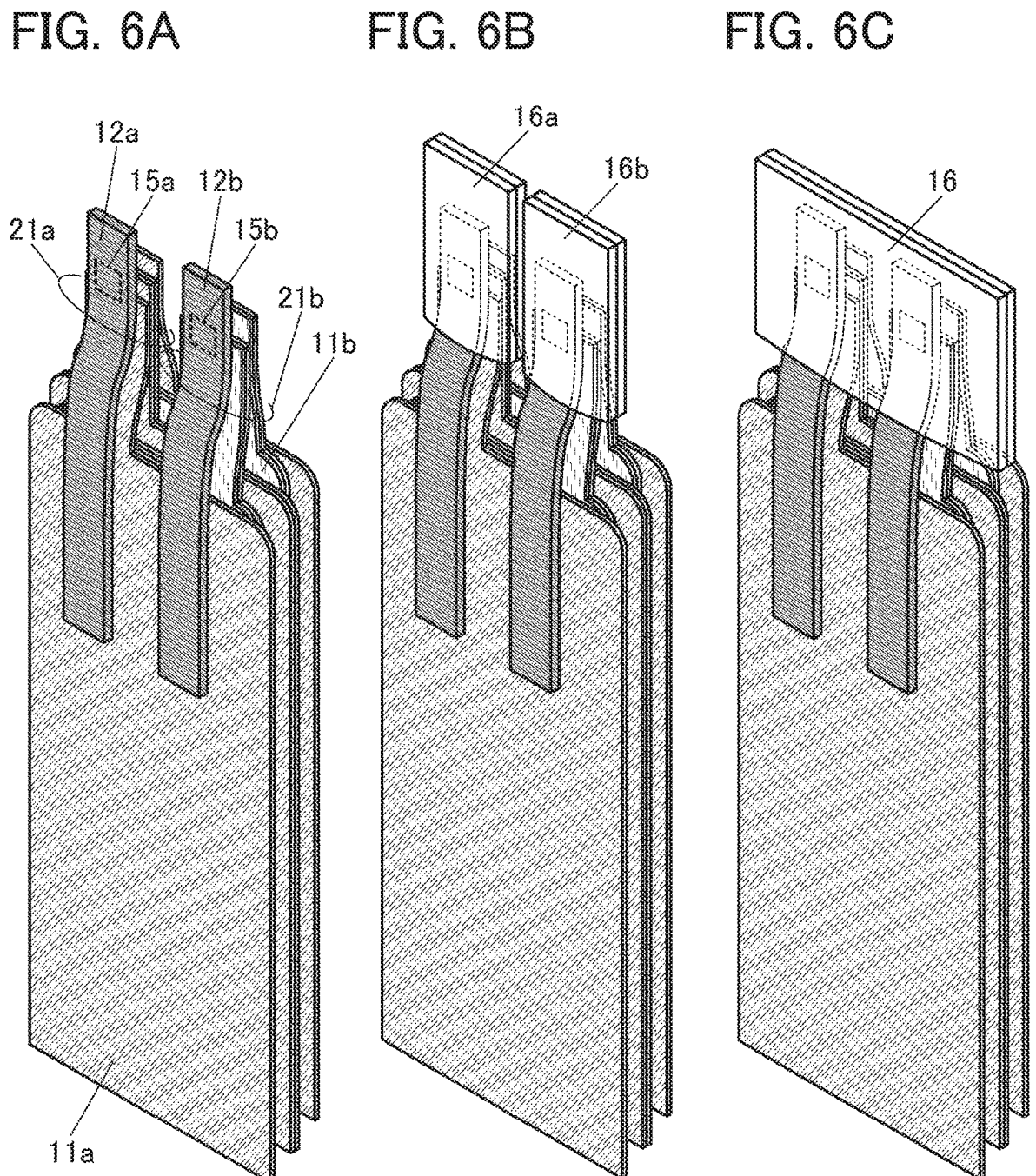
FIGS. 6A to 6C illustrate a manufacturing method of a battery according to one embodiment.

FIG. 6A is a perspective view showing a state of bonding the lead 12*a* and the lead 12*b* to the plurality of current collectors 11*a* and the plurality of current collectors 11*b*, respectively.

As shown in FIG. 6B, the part of the tab portion 21*a* of the current collector 11*a* and the part of the lead 12*a* are covered with an insulating member 16*a*, whereby surfaces thereof can be insulated. At this time, the bonding portion 15*a* is preferably covered with the insulating member 16*a*. Similarly, the part of the tab portion 21*b* of the current collector 11*b* and the part of the lead 12*b* are covered with an insulating member 16*b*.

The insulating member 16a and the insulating member 16b are provided in portions of the current collectors 11a and the current collectors 11b that are to be folded back later. This can prevent contact and an electrical short circuit between a folded-back portion of the current collector 11b and the surface of the current collector 11a. Note that in the case where two current collectors 11a are positioned on the outermost side as shown in FIG. 6A and other drawings, the insulating member 16a on the current collector 11a side need not be necessarily provided. This is because the current collector 11a and the lead 12a are already electrically connected to each other and a problem is thus not caused even when they come into contact with each other.

As shown in FIG. 6C, one insulating member 16 may be provided covering the part of the tab portion 21a of the current collector 11a, the part of the lead 12a, the part of the tab portion 21b of the current collector 11b, and the part of the lead 12b.

As each of the insulating member 16a, the insulating member 16b, and the insulating member 16, an insulating tape such as a polyimide tape can be suitably used. The insulating members having a sticking property can prevent positional shift when the battery changes in shape. Note that the insulating members are not limited thereto, and various modes such as a bag-like shape and a sheet-like shape can be employed. Alternatively, an insulating member formed by curing a liquid resin material applied to a surface of a portion to be insulated may be used.

The insulating member is provided to prevent an electrical short circuit at the time of folding back the tab portion 21a and the tab portion 21b, and the position of the insulating member is not limited to the positions described above. For example, the insulating member can cover the electrode portion 22a and the electrode portion 22b or can be attached to the parts of surfaces thereof. Alternatively, the insulating member can be provided between the current collector 11a and the folded-back portion of the tab portion 21b that is formed when the tab portion 21b is folded back.
[Step S04]

Then, the tab portion 21a and the tab portion 21b are each folded back. The tab portion 21a and the tab portion 21b are preferably folded back such that the surfaces of the tab portion 21a and the tab portion 21b that are bonded to the lead 12a and the lead 12b, respectively, are positioned on the outer side.

Figures 7A, 7B:
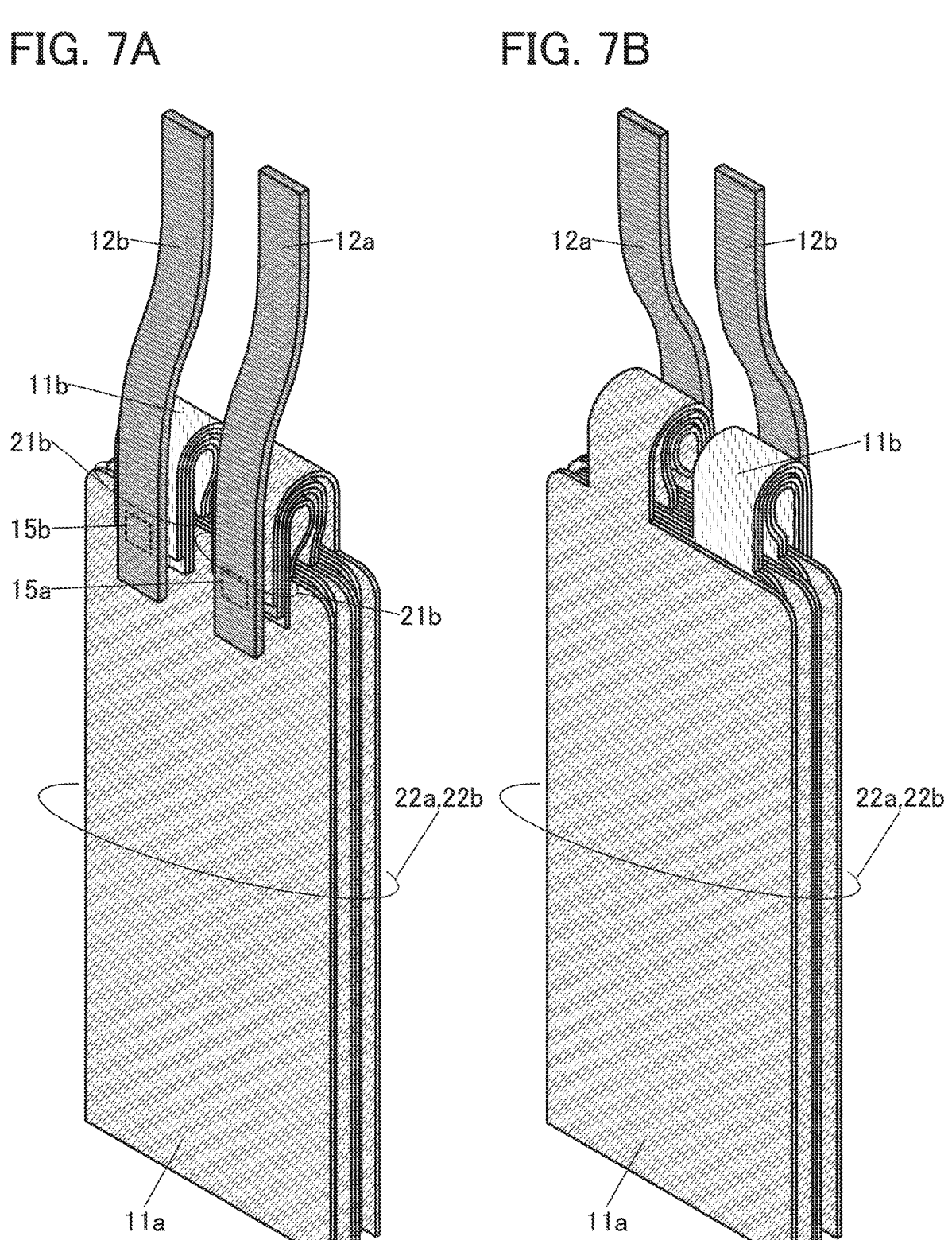
FIGS. 7A and 7B illustrate a manufacturing method of a battery according to one embodiment.

FIG. 7A is a perspective view on the bonding portion 15a side at the time when the tab portion 21a and the tab portion 21b are folded back. FIG. 7B is a perspective view obtained by rotating FIG. 7A by 180 degrees. Note that the insulating member 16a, the insulating member 16b, or the insulating member 16 is not shown below for clarity.

As shown in FIG. 7A, the tab portion 21a and the tab portion 21b are preferably folded such that the part of the lead 12a and the part of the lead 12b overlap with the electrode portion 22a of the current collector 11a and the electrode portion 22b of the current collector 11b. Furthermore, the tab portion 21a and the tab portion 21b are preferably folded such that the tab portion 21a and the tab portion 21b also overlap with the electrode portion 22a and the electrode portion 22b.
[Step S05]

Then, the lead 12a, the lead 12b, the electrode portion 22a, and the electrode portion 22b are fixed by a fixing member 17.

Figures 8A, 8B:
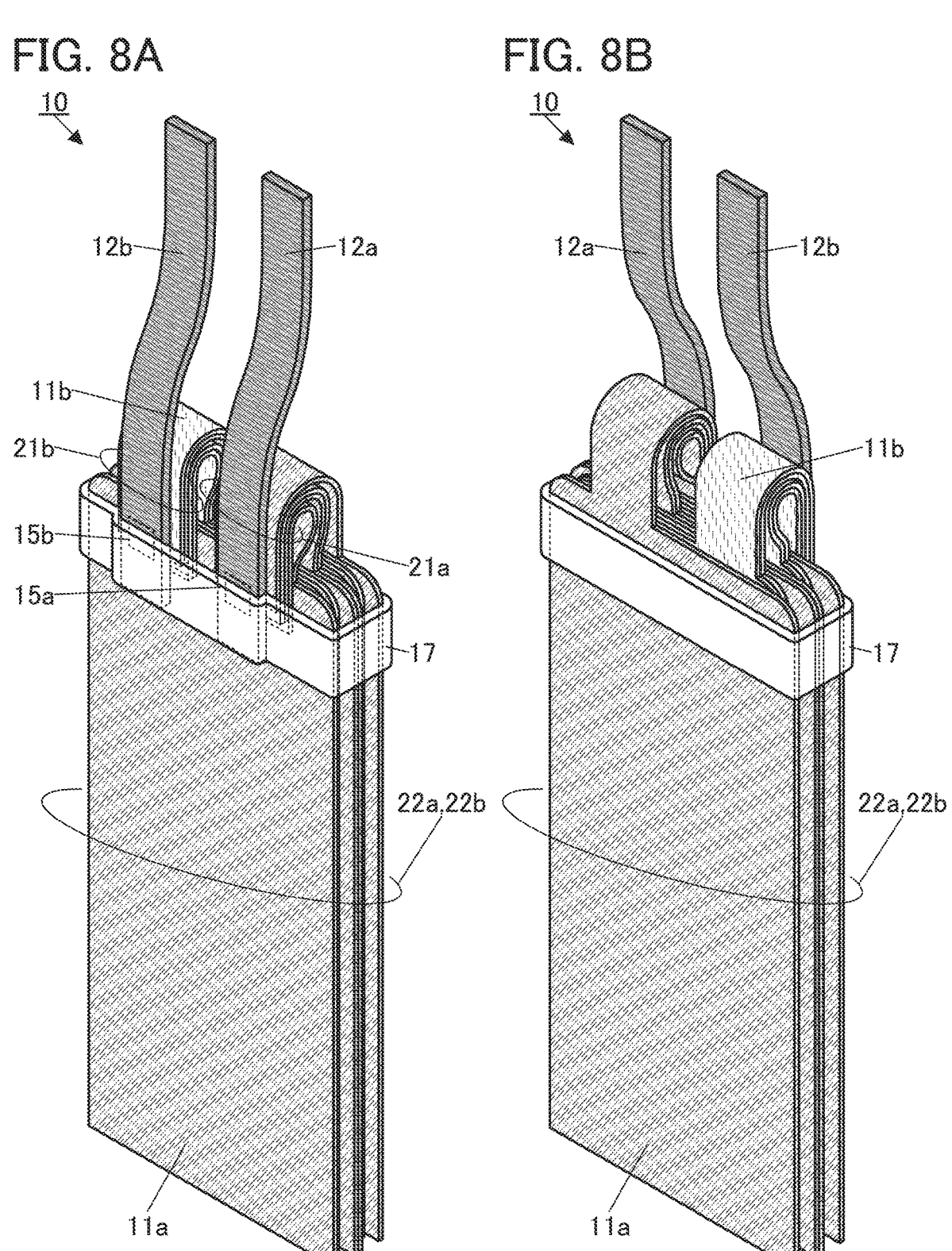
FIGS. 8A and 8B illustrate a manufacturing method of a battery according to one embodiment.

FIG. 8A is a perspective view on the bonding portion 15a side at the time when the fixing member 17 is provided. FIG. 8B is a perspective view obtained by rotating FIG. 8A by 180 degrees.

As the fixing member 17, an insulating tape such as a polyimide tape can be suitably used. Note that the fixing member 17 is not limited thereto; a ring rubber (a rubber band) may be used or an insulating material such as a resin material formed into an appropriate shape may be used.

In the above-described manner, an electrode member 10 can be formed.

As shown in FIG. 8A and other drawings, the electrode member 10 has a structure in which the tab portion 21a and the tab portion 21b are folded back and the bonding portion 15a and the bonding portion 15b overlap with the part of the electrode portion 22a and the part of the electrode portion 22b. The electrode member 10 having the structure can therefore have a shorter length in the length direction than that having a structure in which the tab portion 21a and the tab portion 21b are not folded back. Thus, the battery including the electrode member 10 can be more compact and can have higher capacity per unit volume.
[Step S06]

Then, the electrode member 10 and an electrolyte solution are covered with the exterior body, and the periphery of the exterior body is sealed.

Through the above-described process, the battery of one embodiment of the present invention can be manufactured.

Manufacturing Method Example 2

A manufacturing method example of a battery, which is partly different from the above-described manufacturing method example 1, is described below with reference to drawings. Note that description of the same part as the above description may be skipped.

Figure 9:
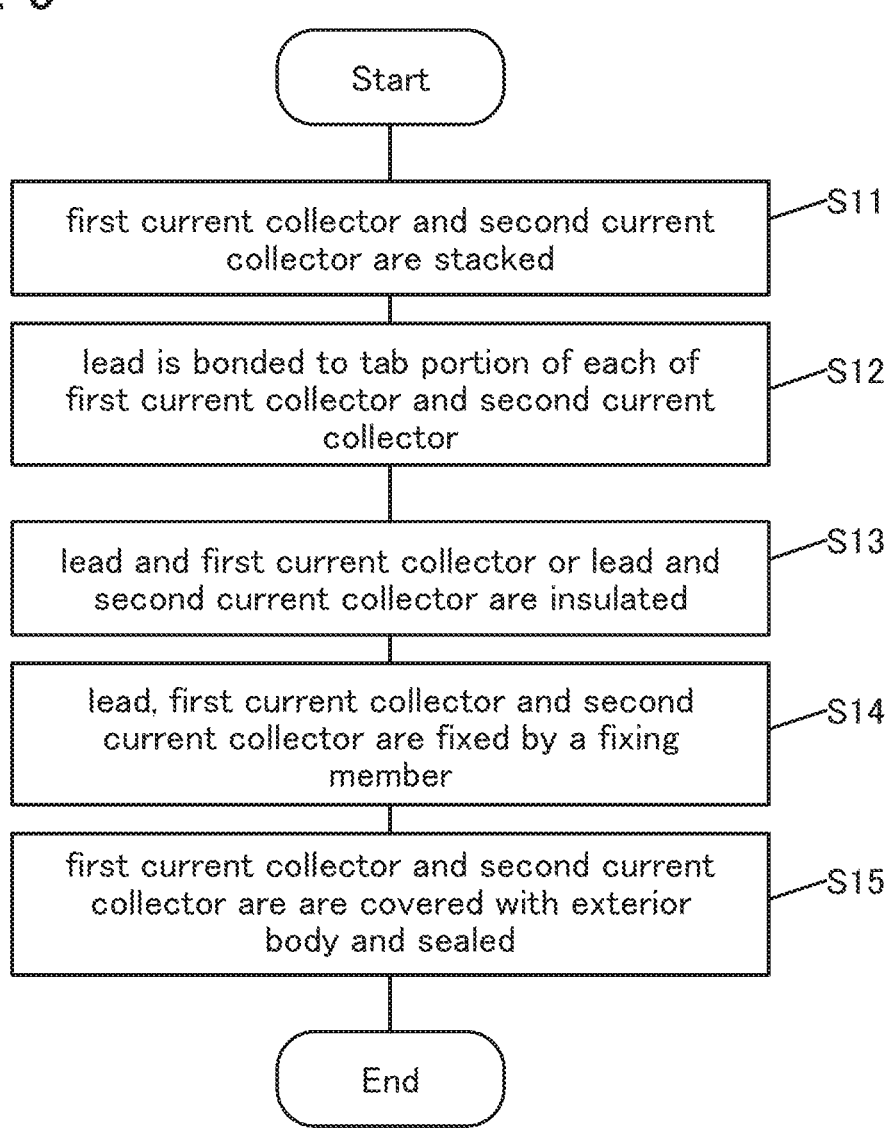
FIG. 9 is a flow chart of a manufacturing method of a battery according to one embodiment.

FIG. 9 is a flow chart of the manufacturing method example described below.
[Step S11]

Figures 10A, 10B:
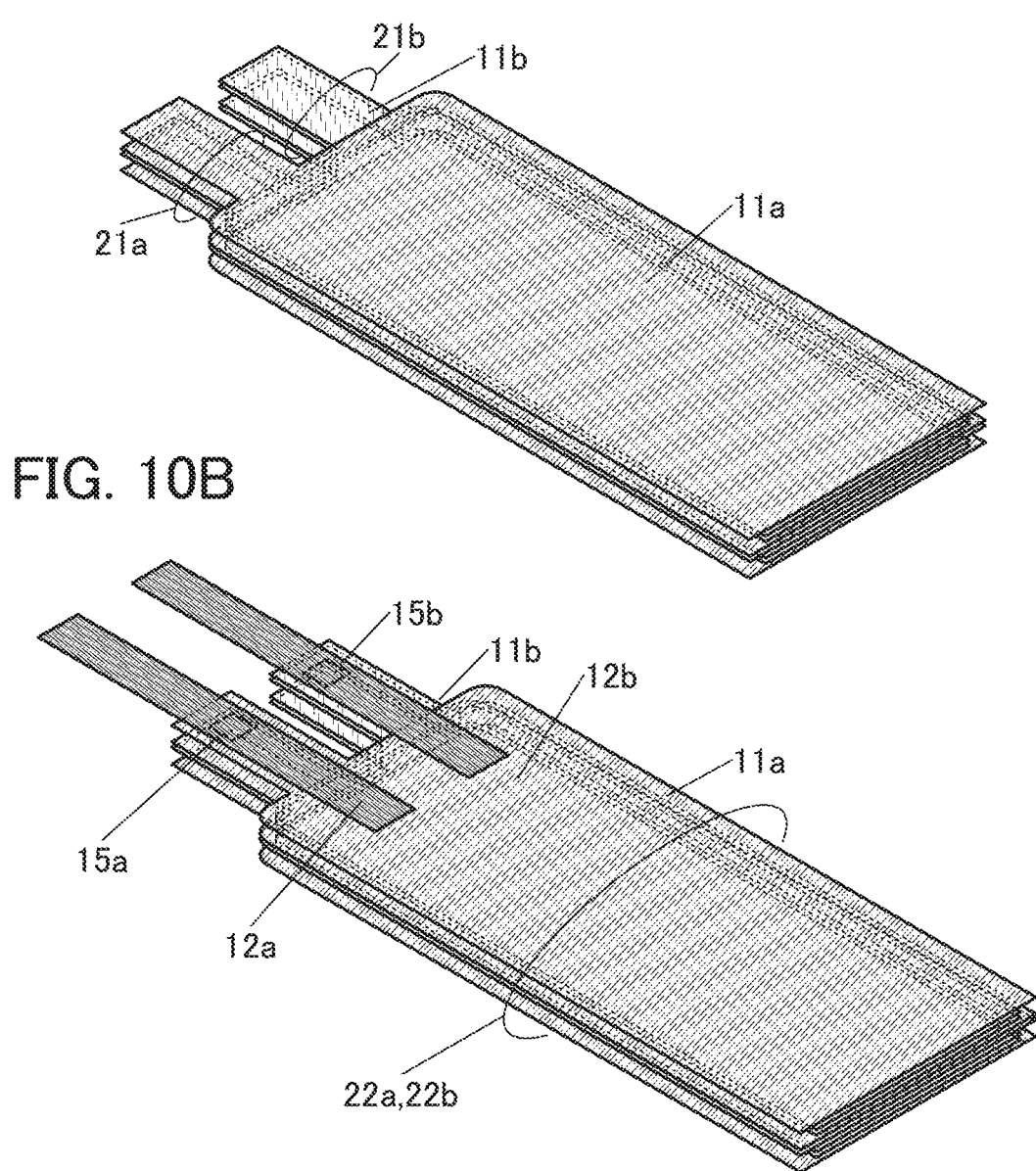
FIGS. 10A and 10B illustrate a manufacturing method of a battery according to one embodiment.

First, as shown in FIG. 10A, the plurality of current collectors 11a and the plurality of current collectors 11b are prepared and stacked. In this example, the positions of the plurality of current collectors 11a and the plurality of current collectors 11b are not shifted from each other unlike in manufacturing method example 1.
[Step S12]

Then, as shown in FIG. 10B, the lead 12a and the lead 12b are bonded to the tab portion 21a of the current collector 11a and the tab portion 21b of the current collector 11b, respectively.

At this time, the lead 12a and the lead 12b have shapes in which the part of the lead 12a and the part of the lead 12b overlap with the electrode portion 22a and the electrode portion 22b.
[Step S13]

Then, in order to prevent the lead 12b and the current collector 11a from being electrically short-circuited, an insulating member 18 is provided therebetween; thus, the lead 12b and the current collector 11a are insulated.

Figures 11A, 11B:
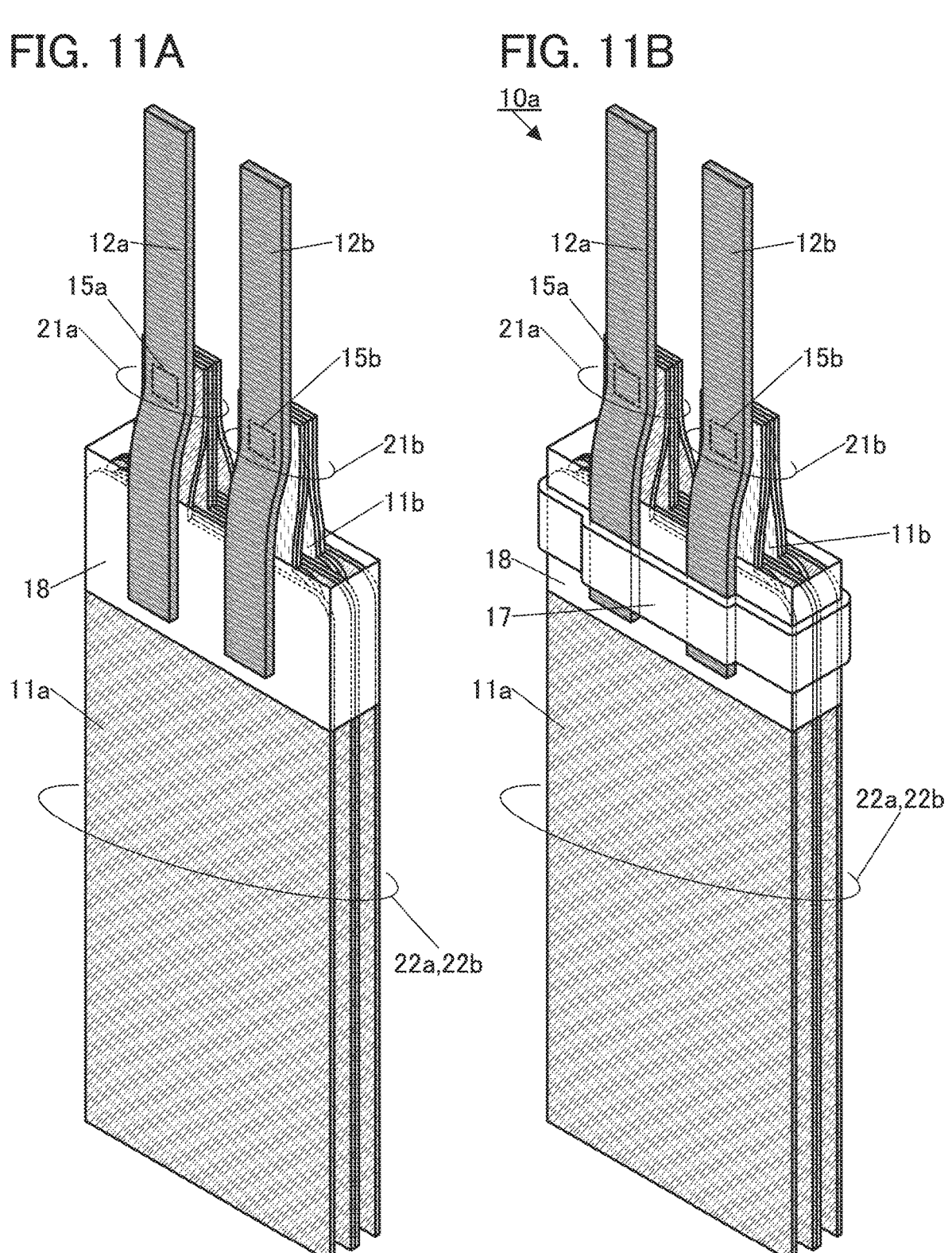
FIGS. 11A and 11B illustrate a manufacturing method of a battery according to one embodiment.

FIG. 11A shows an example in which the insulating member 18 is wound around the part of the current collector 11a and the part of the current collector 11b.

Note that the structure of the insulating member 18 is not limited thereto and can have any of a variety of structures as long as the lead and the current collector that are of opposite polarities can be insulated. FIG. 12A shows an example of the case where an insulating member 18a is positioned only between the current collector 11*a* and the lead 12*b*. FIG. 12B shows an example of the case where a portion of the lead 12*b* that overlaps with the current collector 11*a* is covered with an insulating member 18*b*. FIG. 12C shows an example of the case where a portion of the lead 12*a* that overlaps with the current collector 11*a* and the portion of the lead 12*b* that overlaps with the current collector 11*a* are sandwiched by an insulating member 18*c*.

For the insulating member 18, the insulating member 18*a*, and the insulating member 18*b*, a material similar to that used for forming the insulating member 16 and the like can be used.

[Step S14]

Then, as shown in FIG. 11B, the lead 12*a*, the lead 12*b*, the electrode portion 22*a*, and the electrode portion 22*b* are fixed by the fixing member 17.

In the above-described manner, an electrode member 10*a* can be formed.

In this manufacturing method example, a step of folding back the tab portion 21*a* and the tab portion 21*b* is not performed, which further increases the productivity.

[Step S15]

Then, the electrode member 10*a* and the electrolyte solution are covered with the exterior body, and the periphery of the exterior body is sealed.

Through the above-described process, the battery of one embodiment of the present invention can be manufactured.

The above is the description of the battery manufacturing method example.

[Structure Example of Battery]

A structure example of a battery including the electrode member described in the manufacturing method example is described below with reference to drawings. In particular, a structure example of a battery suitable for repeated bending is described.

Figure 13A:
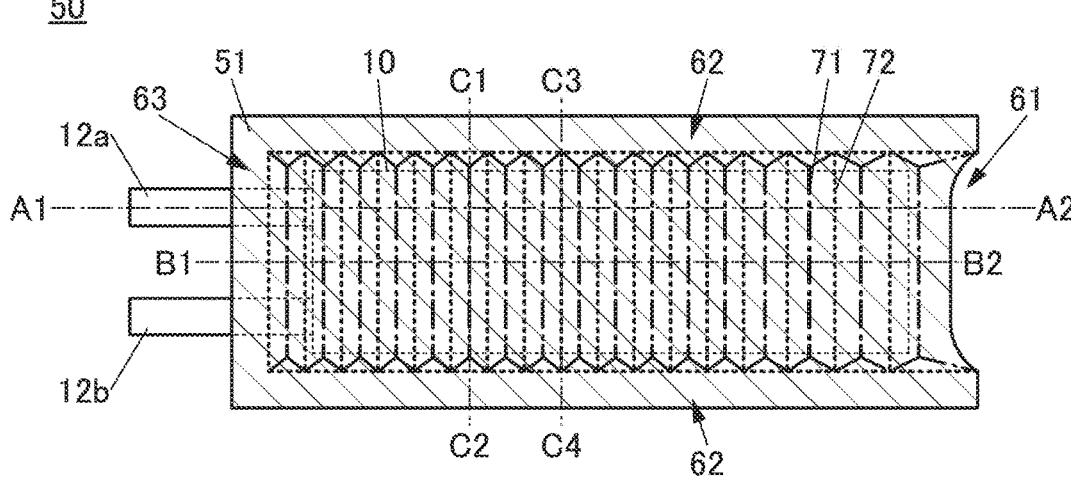
Figure 13A:
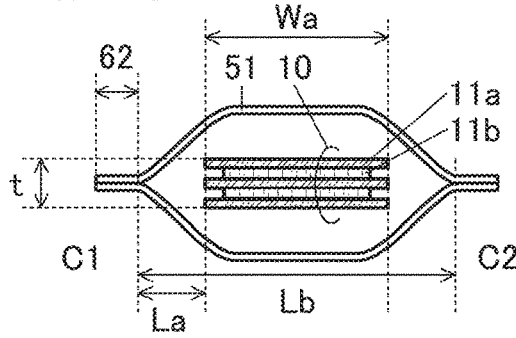
Figure 13A:
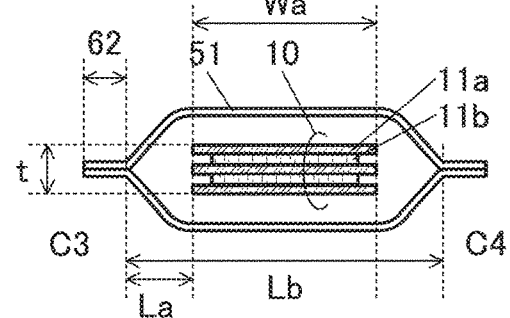

FIG. 13A is a schematic top view of a battery 50. FIGS. 13B1, 13B2, and 13C are schematic cross-sectional views taken along the cutting line C1-C2, the cutting line C3-C4, and the cutting line A1-A2, respectively, in FIG. 13A.

The battery 50 includes an exterior body 51 and the electrode member 10 held in the exterior body 51. The lead 12*a* and the lead 12*b* that the electrode member 10 has are extended to the outside of the exterior body 51. In addition to the electrode member 10, the electrolyte solution (not shown) is enclosed in the exterior body 51.

The exterior body 51 has a film-like shape and is folded in two so as to sandwich the electrode member 10. The exterior body 51 includes a folded portion 61, a pair of seal portions 62, and a seal portion 63. The pair of seal portions 62 is provided with the electrode member 10 positioned therebetween and therefore can also be referred to as side seals. The seal portion 63 has portions overlapping with the lead 12*a* and the lead 12*b* and can also be referred to as a top seal.

The part of the exterior body 51 that overlaps with the electrode member 10 preferably has a wave shape in which crest lines 71 and trough lines 72 are alternately arranged. The seal portions 62 and the seal portion 63 of the exterior body 51 are preferably flat without a wave shape. Note that in some cases, the seal portion 63 includes a step in a portion overlapping with the lead 12*a* and the lead 12*b*.

The above description can be referred to for the structure of the electrode member 10.

FIG. 13B1 shows a cross section cut along the part overlapping with the crest line 71. FIG. 13B2 shows a cross section cut along the part overlapping with the trough line

14

72. FIGS. 13B1 and 13B2 correspond to cross sections of the battery 50 and the electrode member 10 in the width direction.

The distance between an end portion of the electrode member 10 in the width direction, i.e., an end portion of the current collector 11*a* or the current collector 11*b*, and the seal portion 62 is referred to as a distance La. When the battery 50 changes in shape, for example, is bent, the current collector 11*a* and the current collector 11*b* change in shape such that the positions thereof are shifted from each other in the length direction as described later. At the time, if the distance La is too short, the exterior body 51 and the current collector 11*a* or the current collector 11*b* are rubbed hard against each other, so that the exterior body 51 is damaged in some cases. In particular, when a metal film of the exterior body 51 is exposed, there is a concern that the metal film may be corroded by the electrolyte solution. Therefore, the distance La is preferably set as long as possible. However, if the distance La is too long, the volume of the battery 50 is increased.

The distance La between the end portion of the current collector 11*a* or the current collector 11*b* and the seal portion 62 is preferably increased as the thickness of the electrode member 10 is increased.

Specifically, when a thickness of the electrode member 10 is regarded as a thickness t, the distance La is preferably 0.8 times or more and 3.0 times or less, further preferably 0.9 times or more and 2.5 times or less, still further preferably 1.0 times or more and 2.0 times or less as large as the thickness t. When the distance La is in the above-described range, a compact battery highly reliable for bending can be obtained.

Furthermore, when a distance between the pair of seal portions 62 is regarded as a distance Lb, it is preferable that the distance Lb be sufficiently longer than a width of the electrode member 10 (in this example, the width Wa of the current collector 11*a*). In this case, even when the electrode member 10 comes into contact with the exterior body 51 by change in the shape of the battery 50 such as repeated bending, the position of the part of the electrode member 10 can be shifted in the width direction; thus, the electrode member 10 and the exterior body 51 can be effectively prevented from being rubbed against each other.

For example, the difference between the distance La (i.e., the distance between the pair of seal portions 62) and the width Wa of the current collector 11*a* (or the width Wb of the current collector 11*b*) is preferably 1.6 times or more and 6.0 times or less, further preferably 1.8 times or more and 5.0 times or less, still further preferably 2.0 times or more and 4.0 times or less as large as the thickness t of the electrode member 10.

In other words, the distance Lb, the width Wa, and the thickness t preferably satisfy the following relation.

[Formula 1]

$$\frac{Lb - Wa}{2t} \geq a \tag{1}$$

In the formula, a is 0.8 or more and 3.0 or less, preferably 0.9 or more and 2.5 or less, further preferably 1.0 or more and 2.0 or less.

Figure 13C:
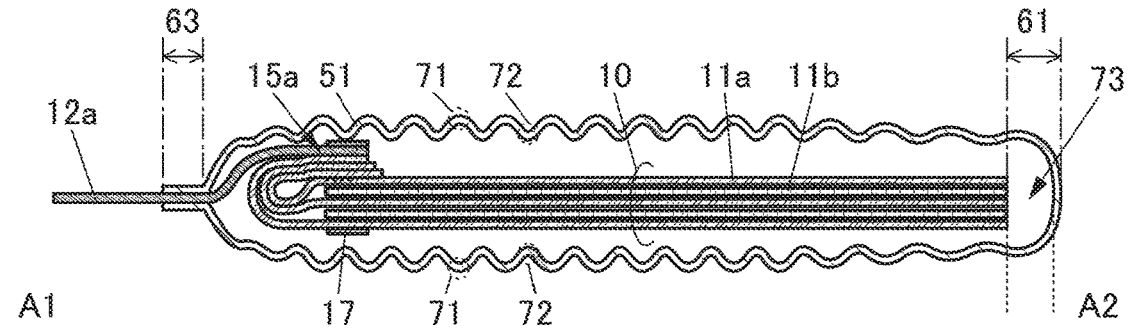

FIG. 13C shows a cross section including the lead 12*a* and corresponds to a cross section of the battery 50 and the electrode member 10 in the length direction.

Figure 13D:
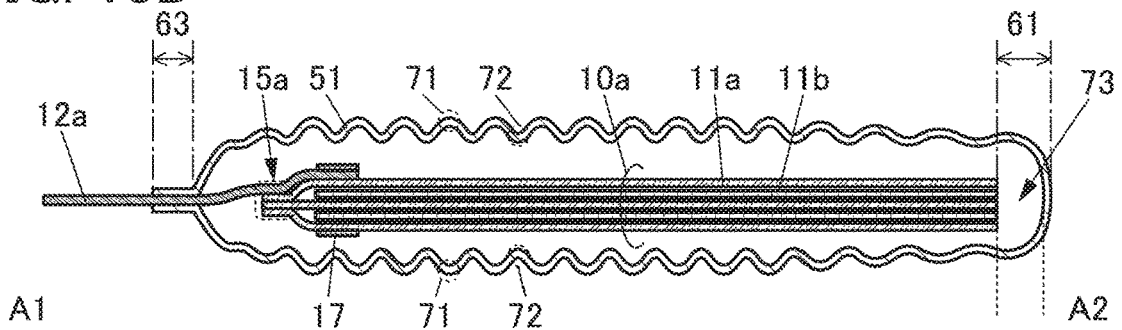

FIG. 13D is a schematic cross-sectional view of a structure in which the electrode member 10a is used instead of the electrode member 10.

As shown in FIG. 13C, space 73 is preferably provided between an end portion of the electrode member 10 in the length direction, i.e., the end portion of the current collector 11a or the current collector 11b, and the exterior body 51 in the folded portion 61.

Figure 14:
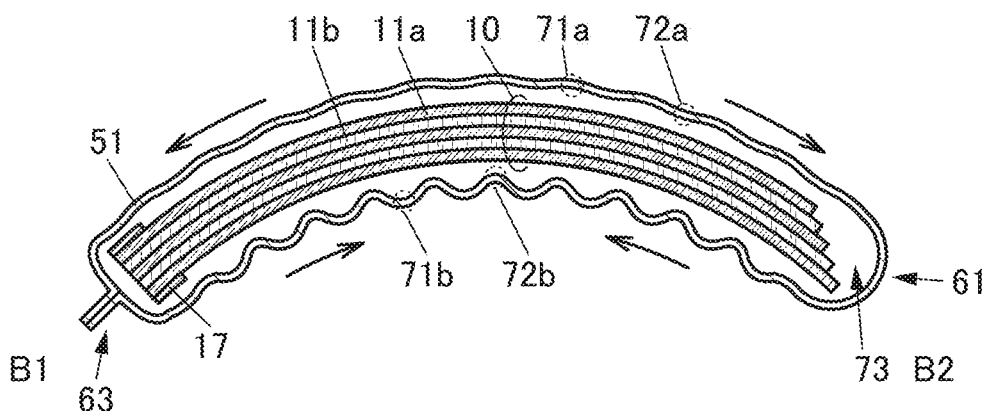
FIG. 14 illustrates a structure example of a battery according to one embodiment.

FIG. 14 is a schematic cross-sectional view of the battery 50 in a state of being bent. FIG. 14 corresponds to a cross section along the cutting line B1-B2 in FIG. 13A.

When the battery 50 is bent, the part of the exterior body 51 positioned on the outer side in bending is unbent and the other part positioned on the inner side changes its shape as it shrinks. More specifically, the part of the exterior body 51 positioned on the outer side in bending changes its shape such that the wave amplitude becomes smaller and the length of the wave period becomes larger. In contrast, the part of the exterior body 51 positioned on the inner side in bending changes its shape such that the wave amplitude becomes larger and the length of the wave period becomes smaller. When the exterior body 51 changes its shape in this manner, stress applied to the exterior body 51 due to bending is relieved, so that a material itself that forms the exterior body 51 does not need to expand and contract. As a result, the battery 50 can be bent with weak force without damage to the exterior body 51.

Furthermore, as shown in FIG. 14, the electrode member 10 changes its shape such that the positions of the current collector 11a and the current collector 11b are shifted relatively. At this time, one end on the seal portion 63 side of each of the current collectors 11a and 11b of the electrode member 10 is fixed by the fixing member 17. Thus, the plurality of current collectors 11a and the plurality of current collectors 11b of the electrode member 10 change their shapes such that the relative positions of the plurality of current collectors 11a and the plurality of current collectors 11b are more shifted at a position closer to the folded portion 61. Therefore, stress applied to the electrode member 10 is relieved, and the current collectors 11a and 11b themselves do not need to expand and contract. As a result, the battery 50 can be bent without damage to the electrode member 10.

Note that in the case where a battery including a solid electrolyte or a gel electrolyte with high viscosity is provided, when the entire electrode member 10 is covered with the electrolyte, the relative positions of the current collector 11a and the current collector 11b are less likely to be shifted, and therefore, relief of stress cannot be expected. Therefore, a plurality of stacks each including an electrolyte layer between a pair of current collectors 11a and 11b are preferably prepared and stacked. Thus, a structure can be obtained in which the relative positions of the current collectors 11a and 11b are shifted even in the case of using a solid electrolyte or a gel electrolyte with high viscosity.

Furthermore, when the space 73 is provided between the electrode member 10 and the exterior body 51, the relative positions of the current collectors 11a and 11b located inward from a neutral plane of the electrode member 10 can be shifted while the current collectors 11a and 11b do not contact the exterior body 51.

In the battery exemplified in this structure example, the exterior body and the electrode member are less likely to be damaged and the battery characteristics are less likely to deteriorate even when the battery is repeatedly bent and unbent.

The above is the description of the battery structure example.

[Components]

Each component of the electrode member and the battery of one embodiment of the present invention is described below.

[Positive Electrode]

The positive electrode includes, for example, the positive electrode current collector and a positive electrode active material layer formed over the positive electrode current collector. The positive electrode active material layer can be formed on one surface or opposite surfaces of the positive electrode current collector.

The positive electrode current collector can be formed using a material that has high conductivity and does not dissolve at the potential of the positive electrode, such as a metal typified by stainless steel, gold, platinum, aluminum, or titanium, or an alloy thereof. Alternatively, an aluminum alloy to which an element which improves heat resistance, such as silicon, titanium, neodymium, scandium, or molybdenum, is added can be used. Still alternatively, a metal element which forms silicide by reacting with silicon can be used. Examples of the metal element which forms silicide by reacting with silicon are zirconium, titanium, hafnium, vanadium, niobium, tantalum, chromium, molybdenum, tungsten, cobalt, nickel, and the like. The positive electrode current collector can have a foil-like shape, a plate-like shape (a sheet-like shape), a net-like shape, a punching-metal shape, an expanded-metal shape, or the like as appropriate. The positive electrode current collector preferably has a thickness of greater than or equal to 5 μm and less than or equal to 30 μm. The surface of the positive electrode current collector may be provided with an undercoat layer using graphite or the like.

The positive electrode active material layer may further include, in addition to a positive electrode active material, a binder for increasing adhesion of the positive electrode active material, a conductive additive for increasing the conductivity of the positive electrode active material layer, and the like.

Examples of the positive electrode active material that can be used for the positive electrode active material layer include a composite oxide with an olivine crystal structure, a composite oxide with a layered rock-salt crystal structure, and a composite oxide with a spinel crystal structure. For example, a compound such as $LiFeO_2$, $LiCoO_2$, $LiNiO_2$, $LiMn_2O_4$, $V_2O_5$, $Cr_2O_5$, or $MnO_2$ can be used as the positive electrode active material.

In particular, $LiCoO_2$ is preferable because it has high capacity and higher stability in the air and higher thermal stability than $LiNiO_2$, for example.

It is preferable to add a small amount of lithium nickel oxide ($LiNiO_2$ or $LiNi_{1-x}M_xO_2$ ($0<x<1$) (M=Co, Al, or the like)) to a lithium-containing material with a spinel crystal structure which contains manganese such as $LiMn_2O_4$ because characteristics of the secondary battery using such a material can be improved.

Alternatively, a complex material ($LiMPO_4$ (general formula) (M is one or more of Fe(II), Mn(II), Co(II), and Ni(II))) can be used. Typical examples of the general formula $LiMPO_4$ which can be used as a material are lithium compounds such as $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ ($a+b\leq1$, $0<a<1$, and $0<b<1$), $LiFe_cNi_dCo_ePO_4$, $LiFe_cNi_dMn_ePO_4$, $LiNi_cCo_dMn_ePO_4$ ($c+d+e\leq1$, $0<c<1$, $0<d<1$, and $0<e<1$), and $LiFe_fNi_gCo_hMn_iPO_4$ ($f+g+h+i\leq1$, $0<f<1$, $0<g<1$, $0<h<1$, and $0<i<1$).

$LiFePO_4$ is particularly preferable because it meets requirements for the positive electrode active material in a balanced manner, such as safety, stability, high capacity density, and the existence of lithium ions that can be extracted in initial oxidation (charging).

Alternatively, a complex material such as $Li_{(2-j)}MSiO_4$ (general formula) (M is one or more of Fe(II), Mn(II), Co(II), and Ni(II); $0 \le j \le 2$) can be used. Typical examples of the general formula $Li_{(2-j)}MSiO_4$ which can be used as a material are lithium compounds such as $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ (k+l≤1, 0<k<1, and 0<l<1), $Li_{(2-j)}Fe_mN-i_nCo_qSiO_4$, $Li_{(2-j)}Fe_mNi_nMn_qSiO_4$, $Li_{(2-j)}Ni_mCo_nMn_qSiO_4$ (m+n+q≤1, 0<m<1, 0<n<1, and 0<q<1), and $Li_{(2-j)}Fe_rNi_sCo_tMn_uSiO_4$ (r+s+t+u≤1, 0<r<1, 0<s<1, 0<t<1, and 0<u<1).

Still alternatively, a nasicon compound expressed by $A_xM_2(XO_4)_3$ (general formula) (A=Li, Na, or Mg, M=Fe, Mn, Ti, V, or Nb, X=S, P, Mo, W, As, or Si) can be used for the positive electrode active material. Examples of the nasicon compound are $Fe_2(MnO_4)_3$, $Fe_2(SO_4)_3$, and $Li_3Fe_2(PO_4)_3$. Further alternatively, a compound expressed by $Li_2MPO_4F$, $Li_2MP_2O_7$, or $Li_5MO_4$ (general formula) (M=Fe or Mn), a perovskite fluoride such as $NaFeF_3$ and $FeF_3$, a metal chalcogenide (a sulfide, a selenide, or a telluride) such as $TiS_2$ and $MoS_2$, an oxide with an inverse spinel crystal structure such as $LiMVO_4$, a vanadium oxide ($V_2O_5$, $V_6O_{13}$, $LiV_3O_8$, or the like), a manganese oxide, an organic sulfur compound, or the like can be used as the positive electrode active material.

In the case where carrier ions are alkali metal ions other than lithium ions, or alkaline-earth metal ions, a material containing an alkali metal (e g, sodium or potassium) or an alkaline-earth metal (e.g., calcium, strontium, barium, beryllium, or magnesium) instead of lithium may be used as the positive electrode active material. For example, the positive electrode active material may be a layered oxide containing sodium such as $NaFeO_2$ or $Na_{2/3}[Fe_{1/2}Mn_{1/2}]O_2$.

Further alternatively, any of the above materials may be combined to be used as the positive electrode active material. For example, a solid solution obtained by combining two or more of the above materials can be used as the positive electrode active material. For example, a solid solution of $LiCo_{1/3}Mn_{1/3}N_{1/3}O_2$ and $Li_2MnO_3$ can be used as the positive electrode active material.

Note that a conductive material such as a carbon layer may be provided on a surface of the positive electrode active material layer. With the conductive material such as the carbon layer, conductivity of the electrode can be increased. For example, the positive electrode active material layer can be coated with the carbon layer by mixing a carbohydrate such as glucose at the time of baking the positive electrode active material.

The average particle diameter of the primary particle of the positive electrode active material layer is preferably greater than or equal to 50 nm and less than or equal to 100 μm.

Examples of the conductive additive include acetylene black (AB), graphite (black lead) particles, carbon nanotubes, graphene, and fullerene.

A network for electron conduction can be formed in the positive electrode by the conductive additive. The conductive additive also allows maintaining of a path for electric conduction between the particles of the positive electrode active material layer. The addition of the conductive additive to the positive electrode active material layer increases the electron conductivity of the positive electrode active material layer.

As the binder, instead of polyvinylidene fluoride (PVDF) as a typical one, polyimide, polytetrafluoroethylene, polyvinyl chloride, ethylene-propylene-diene polymer, styrene-butadiene rubber, acrylonitrile-butadiene rubber, fluorine rubber, polyvinyl acetate, polymethyl methacrylate, polyethylene, nitrocellulose or the like can be used.

A favorable range of the content of the binder in the positive electrode active material layer may be determined as appropriate in accordance with the particle diameter of the active material, and can be preferably greater than or equal to 1 wt % and less than or equal to 10 wt %. For example, the favorable range can be greater than or equal to 2 wt % and less than or equal to 8 wt % or greater than or equal to 3 wt % and less than or equal to 5 wt %. The content of the conductive additive in the positive electrode active material layer is preferably greater than or equal to 1 wt % and less than or equal to 10 wt %, further preferably greater than or equal to 1 wt % and less than or equal to 5 wt %.

In the case where the positive electrode active material layer is formed by a coating method, the positive electrode active material, the binder, and the conductive additive are mixed to form a positive electrode paste (slurry), and the positive electrode paste is applied to the positive electrode current collector and dried.

[Negative Electrode]

The negative electrode includes, for example, the negative electrode current collector and a negative electrode active material layer formed over the negative electrode current collector. The negative electrode active material layer can be formed on one surface or opposite surfaces of the negative electrode current collector.

The negative electrode current collector can be formed using a material that has high conductivity and is not alloyed with a carrier ion of lithium or the like, such as stainless steel, gold, platinum, iron, copper, titanium, or an alloy thereof. Alternatively, an aluminum alloy to which an element which improves heat resistance, such as silicon, titanium, neodymium, scandium, or molybdenum, is added can be used. The negative electrode current collector can have a foil-like shape, a plate-like shape (a sheet-like shape), a net-like shape, a punching-metal shape, an expanded-metal shape, or the like as appropriate. The negative electrode current collector preferably has a thickness greater than or equal to 5 μm and less than or equal to 30 μm. The surface of the negative electrode current collector may be provided with an undercoat layer using graphite or the like.

The negative electrode active material layer may further include, in addition to a negative electrode active material, a binder for increasing adhesion of the negative electrode active material, a conductive additive for increasing the conductivity of the negative electrode active material layer, and the like.

There is no particular limitation on the negative electrode active material as long as it is a material with which lithium can be dissolved and precipitated or a material into/from which lithium ions can be inserted and extracted. Other than a lithium metal or lithium titanate, a carbon-based material generally used in the field of power storage, an alloy-based material, or the like can also be used for the negative electrode active material layer.

The lithium metal is preferable because of its low redox potential (3.045 V lower than that of a standard hydrogen electrode) and high specific capacity per unit weight and per unit volume (3860 mAh/g and 2062 $mAh/cm^3$).

Examples of the carbon-based material include graphite, graphitizing carbon (soft carbon), non-graphitizing carbon (hard carbon), a carbon nanotube, graphene, carbon black, and the like.

Examples of the graphite include artificial graphite such as meso-carbon microbeads (MCMB), coke-based artificial graphite, or pitch-based artificial graphite and natural graphite such as spherical natural graphite.

Graphite has a low potential substantially equal to that of a lithium metal (0.1 V to 0.3 V vs. Li/Li$^+$) when lithium ions are inserted into the graphite (when a lithium-graphite intercalation compound is formed). For this reason, a lithium ion battery can have a high operating voltage. In addition, graphite is preferable because of its advantages such as relatively high capacity per unit volume, small volume expansion, low cost, and safety greater than that of a lithium metal.

For the negative electrode active material, an alloy-based material or an oxide which enables charge-discharge reaction by an alloying reaction and a dealloying reaction with lithium can be used. In the case where lithium ions are carrier ions, the alloy-based material is, for example, a material containing at least one of Mg, Ca, Al, Si, Ge, Sn, Pb, Sb, Bi, Ag, Au, Zn, Cd, Hg, In, and the like. Such elements have higher capacity than carbon. In particular, silicon has a significantly high theoretical capacity of 4200 mAh/g. For this reason, silicon is preferably used as the negative electrode active material. Examples of the alloy-based material using such elements include $Mg_2Si$, $Mg_2Ge$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, SbSn, and the like.

Alternatively, for the negative electrode active material, an oxide such as SiO, SnO, $SnO_2$, titanium oxide ($TiO_2$), lithium titanium oxide ($Li_4Ti_5O_{12}$), lithium-graphite intercalation compound ($Li_xC_6$), niobium oxide ($Nb_2O_5$), tungsten oxide ($WO_2$), or molybdenum oxide ($MoO_2$) can be used.

Still alternatively, for the negative electrode active material, $Li_{3-x}M_xN$ (M is Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g and 1890 mAh/cm$^3$).

A nitride containing lithium and a transition metal is preferably used, in which case lithium ions are contained in the negative electrode active materials and thus the negative electrode active materials can be used in combination with a material for a positive electrode active material that does not contain lithium ions, such as $V_2O_5$ or $Cr_3O_8$. Note that in the case of using a material containing lithium ions as a positive electrode active material, the nitride containing lithium and a transition metal can be used as the negative electrode active material by extracting the lithium ions contained in the positive electrode active material in advance.

Alternatively, a material which causes a conversion reaction can be used as the negative electrode active material. For example, a transition metal oxide with which an alloying reaction with lithium is not caused, such as cobalt oxide (CoO), nickel oxide (NiO), or iron oxide (FeO), may be used for the negative electrode active material. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, or CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$. Note that any of the fluorides can be used as a positive electrode active material because of its high potential.

In the case where the negative electrode active material layer is formed by a coating method, the negative electrode active material and the binder are mixed to form a negative electrode paste (slurry), and the negative electrode paste is applied to the negative electrode current collector and dried. Note that a conductive additive may be added to the negative electrode paste.

Graphene may be formed on a surface of the negative electrode active material layer. In the case of using silicon as the negative electrode active material, the volume of silicon is greatly changed due to occlusion and release of carrier ions in charge-discharge cycles. Therefore, adhesion between the negative electrode current collector and the negative electrode active material layer is decreased, resulting in degradation of battery characteristics caused by charge and discharge. Thus, graphene is preferably formed on a surface of the negative electrode active material layer containing silicon because even when the volume of silicon is changed in charge-discharge cycles, decrease in the adhesion between the negative electrode current collector and the negative electrode active material layer can be inhibited, which makes it possible to reduce degradation of battery characteristics.

Alternatively, a coating film of an oxide or the like may be formed on the surface of the negative electrode active material layer. A coating film formed by decomposition or the like of an electrolyte solution or the like in charging cannot release electric charges used at the formation, and therefore forms irreversible capacity. In contrast, the film of an oxide or the like provided on the surface of the negative electrode active material layer in advance can reduce or prevent generation of irreversible capacity.

As the coating film coating the negative electrode active material layer, an oxide film of any one of niobium, titanium, vanadium, tantalum, tungsten, zirconium, molybdenum, hafnium, chromium, aluminum, and silicon or an oxide film containing any one of these elements and lithium can be used. Such a coating film is denser than a conventional coating film formed on a surface of a negative electrode due to a decomposition product of an electrolyte solution.

For example, niobium oxide ($Nb_2O_5$) has a low electric conductivity of $10^{-9}$ S/cm and a high insulating property. For this reason, a niobium oxide film inhibits electrochemical decomposition reaction between the negative electrode active material and the electrolyte solution. On the other hand, niobium oxide has a lithium diffusion coefficient of $10^{-9}$ cm$^2$/sec and high lithium ion conductivity. Therefore, niobium oxide can transmit lithium ions. Alternatively, silicon oxide or aluminum oxide may be used.

A sol-gel method can be used to coat the negative electrode active material layer with the coating film, for example. The sol-gel method is a method for forming a thin film in such a manner that a solution of metal alkoxide, a metal salt, or the like is changed into a gel, which has lost its fluidity, by hydrolysis reaction and polycondensation reaction and the gel is baked. Since a thin film is formed from a liquid phase in the sol-gel method, raw materials can be mixed uniformly on the molecular scale. For this reason, by adding a negative electrode active material such as graphite to a raw material of the metal oxide film which is a solvent, the active material can be easily dispersed into the gel. In such a manner, the coating film can be formed on the surface of the negative electrode active material layer. A decrease in the capacity of the battery can be prevented by using the coating film.

[Separator]

As a material of the separator, a porous insulator such as cellulose, polypropylene (PP), polyethylene (PE), polybutene, nylon, polyester, polysulfone, polyacrylonitrile, polyvinylidene fluoride, tetrafluoroethylene, or polyphenylene sulfide can be used. Alternatively, nonwoven fabric of a glass fiber or the like, or a diaphragm in which a glass fiber and a polymer fiber are mixed may be used.

[Electrolyte Solution]

As an electrolyte in the electrolyte solution, a material having carrier ion mobility and containing lithium ions serving as carrier ions is used. Typical examples of the electrolyte are lithium salts such as $LiPF_6$, $LiClO_4$, $LiAsF_6$, $LiBF_4$, $LiCF_3SO_3$, $Li(CF_3SO_2)_2N$, $Li(C_2F_5SO_2)_2N$, and $Li(SO_2F)_2N$. One of these electrolytes may be used alone, or two or more of them may be used in an appropriate combination and in an appropriate ratio.

It is particularly preferable that the electrolyte have high heat resistance in the case where treatment is performed at high temperature in molding rubber or the like. It is preferable to use imide salt having high thermal decomposition temperature, for example.

As a solvent of the electrolyte solution, a material having carrier ion mobility is used. As the solvent of the electrolyte solution, an aprotic organic solvent is preferably used. Typical examples of aprotic organic solvents include ethylene carbonate (EC), propylene carbonate (PC), dimethyl carbonate, diethyl carbonate (DEC), ethylmethyl carbonate (EMC), γ-butyrolactone, acetonitrile, dimethoxyethane, tetrahydrofuran, and the like, and one or more of these materials can be used. When a gelled high-molecular material is used as the solvent of the electrolytic solution or a high-molecular material for gelling is added to the electrolytic solution, for example, safety against liquid leakage and the like is improved. Furthermore, a thinner storage battery having lighter weight can be provided. Typical examples of gelled high-molecular materials include a silicone gel, an acrylic gel, an acrylonitrile gel, a polyethylene oxide-based gel, a polypropylene oxide-based gel, a gel of a fluorine-based polymer, and the like. Alternatively, the use of one or more kinds of ionic liquids (room temperature molten salts) which have features of non-flammability and non-volatility as the solvent of the electrolyte solution can prevent the storage battery from exploding or catching fire even when the storage battery internally shorts out or the internal temperature increases owing to overcharging or the like. An ionic liquid is a salt in the fluid state and has high ion mobility (conductivity). An ionic liquid contains a cation and an anion. Examples of ionic liquids include an ionic liquid containing an ethylmethylimidazolium (EMI) cation and an ionic liquid containing an N-methyl-N-propylpiperidinium ($PP_{13}$) cation.

It is particularly preferable to use a material having high boiling temperature as the solvent of the electrolyte solution in the case where treatment is performed at high temperature. It is preferable to use propylene carbonate (PC), for example.

[Exterior Body]

There are a variety of structures of a secondary battery, and a film is used as the exterior body in this embodiment. Note that the film used for the exterior body is a single-layer film selected from a metal film (e.g., an aluminum film, a stainless steel film, and a nickel steel film), a plastic film made of an organic material, a hybrid material film including an organic material (e.g., an organic resin or fiber) and an inorganic material (e.g., ceramic), and a carbon-containing inorganic film (e.g., a carbon film or a graphite film); or a stacked-layer film including two or more of the above films. Forming depressions or projections on a surface of a metal film by embossing increases the surface area of the exterior body exposed to outside air, achieving efficient heat dissipation.

In the case where the secondary battery is changed in form by externally applying force, bending stress is externally applied to the exterior body of the secondary battery. This might partly deform or damage the exterior body. Projections or depressions formed on the exterior body can relieve a strain caused by stress applied to the exterior body. Therefore, the secondary battery can be more reliable. Note that a "strain" is the scale of change in form indicating the displacement of a point of an object relative to the reference (initial) length of the object. The exterior body having depressions or projections can reduce the influence of a strain caused by application of external force to the battery to an acceptable level. Thus, the battery having high reliability can be provided.

The above is the description of the components.

At least part of this embodiment can be implemented in combination with any of the other embodiments described in this specification as appropriate.

Embodiment 2

In this embodiment, examples of electronic devices incorporating a battery obtained using Embodiment 1, in particular, a secondary battery will be described.

The secondary battery that can be fabricated according to Embodiment 1 includes a thin and flexible film as an exterior body and thus can flexibly change its form.

A part of an electronic device like a watch is brought into contact with a part of the body (wrist or arm) of a user, that is, the user wears the electronic device, whereby the user can feel like the electronic device is lighter than the actual weight. A flexible secondary battery can be provided in an electronic device having a form with a curved surface that fits a part of the body of a user so that the secondary battery can be fixed in a suitable form.

When a user moves a part of the body where an electronic device is on, the user might feel uncomfortable regarding the electronic device as a distraction, and feel stress even in the case where the electronic device has a curved surface that fits the part of the body. An electronic device provided with a flexible secondary battery in a portion whose form can be changed can change its form at least partly according to movement of the body of a user; thus, an electronic device with which the user does not feel uncomfortable can be obtained.

An electronic device does not necessarily have a form with a curved surface or a complicated form; an electronic device may have a simple form. The number or size of components that can be incorporated in an electronic device with a simple form, for example, is determined depending on the volume of a space formed by a housing of the electronic device in many cases. Providing a flexible secondary battery in a small space between components other than the secondary battery enables a space formed by a housing of an electronic device to be efficiently used; thus, the electronic device can be reduced in size.

Examples of wearable devices include wearable input terminals such as a wearable camera, a wearable microphone, and a wearable sensor; wearable output terminals such as a wearable display and a wearable speaker; and wearable input/output terminals having the functions of any of the input terminals and any of the output terminals.

Another example of a wearable device is a wearable computer including a CPU, which is a typical example of a device that controls each device and calculates or processes data. Other examples of wearable devices include devices that store data, send data, and receive data, typically, a portable information terminal and a memory.

Examples of electronic devices each using a flexible secondary battery are as follows: display devices such as head-mounted displays and goggle-type displays, televisions (also referred to as television receivers), desktop personal computers, laptop personal computers, monitors for computers or the like, digital cameras, digital video cameras, digital photo frames, electronic notebooks, e-book readers, electronic translators, toys, audio input devices such as microphones, electric shavers, electric toothbrushes, high-frequency heating appliances such as microwave ovens, electric rice cookers, electric washing machines, electric vacuum cleaners, water heaters, electric fans, hair dryers, air-conditioning systems such as humidifiers, dehumidifiers, and air conditioners, dishwashers, dish dryers, clothes dryers, futon dryers, electric refrigerators, electric freezers, electric refrigerator-freezers, freezers for preserving DNA, flashlights, electric power tools, alarm devices such as smoke detectors, gas alarm devices, and security alarm devices, industrial robots, health equipment and medical equipment such as hearing aids, cardiac pacemakers, X-ray equipment, radiation counters, electric massagers, and dialyzers, mobile phones (also referred to as mobile phone devices or cell phones), portable game machines, portable information terminals, lighting devices, headphone stereos, stereos, remote controls, clocks such as table clocks and wall clocks, cordless phone handsets, transceivers, pedometers, calculators, portable or stationary music reproduction devices such as digital audio players, and large game machines such as pachinko machines.

In addition, a flexible secondary battery can be incorporated along a curved inside/outside wall surface of a house or a building or a curved interior/exterior surface of an automobile.

FIG. 15A illustrates an example of a mobile phone. A mobile phone 7400 includes a display portion 7402 incorporated in a housing 7401, an operation button 7403, an external connection port 7404, a speaker 7405, a microphone 7406, and the like. Note that the mobile phone 7400 includes a secondary battery 7407.

FIG. 15B illustrates the mobile phone 7400 that is curved. When the whole mobile phone 7400 is curved by external force, the secondary battery 7407 included in the mobile phone 7400 is also curved. FIG. 15C illustrates the bent secondary battery 7407. The secondary battery 7407 is a laminated storage battery (also referred to as a layered battery or a film-covered battery). The secondary battery 7407 is fixed while being bent. Note that the secondary battery 7407 includes a lead electrode 7408 electrically connected to a current collector 7409. A film serving as an exterior body of the secondary battery 7407 is embossed, so that the secondary battery 7407 has high reliability even when bent, for example. The mobile phone 7400 may further be provided with a slot for insertion of a SIM card, a connector portion for connecting a USB device such as a USB memory.

FIG. 15D illustrates an example of a mobile phone that can be bent. When bent to be put around a forearm, the mobile phone can be used as a bangle-type mobile phone as in FIG. 15E. A mobile phone 7100 includes a housing 7101, a display portion 7102, an operation button 7103, and a secondary battery 7104. FIG. 15F illustrates the secondary battery 7104 in the state of being bent. When the mobile phone is worn on a user's arm while the secondary battery 7104 is bent, the housing changes its form and the curvature of a part or the whole of the secondary battery 7104 is changed. Specifically, a part or the whole of the housing or the main surface of the secondary battery 7104 is changed in the range of radius of curvature from 10 mm to 150 mm inclusive. Note that the secondary battery 7104 includes a lead electrode 7105 that is electrically connected to a current collector 7106. Pressing is performed to form a plurality of projections and depressions on a surface of a film serving as an exterior body of the secondary battery 7104, for example; thus, reliability is retained even when the secondary battery 7104 is bent many times with different curvatures. The mobile phone 7100 may further be provided with a slot for insertion of a SIM card, a connector portion for connecting a USB device such as a USB memory. When a center portion of the mobile phone illustrated in FIG. 15D is bent, a form illustrated in FIG. 15G can be obtained. When the center portion of the mobile phone is folded so that end portions of the mobile phone overlap with each other as illustrated in FIG. 15H, the mobile phone can be reduced in size so as to be put in, for example, a pocket of clothes a user wears. As described above, the mobile phone illustrated in FIG. 15D can change its form in more than one way, and it is desirable that at least the housing 7101, the display portion 7102, and the secondary battery 7104 have flexibility in order to change the form of the mobile phone.

Figure 16A:
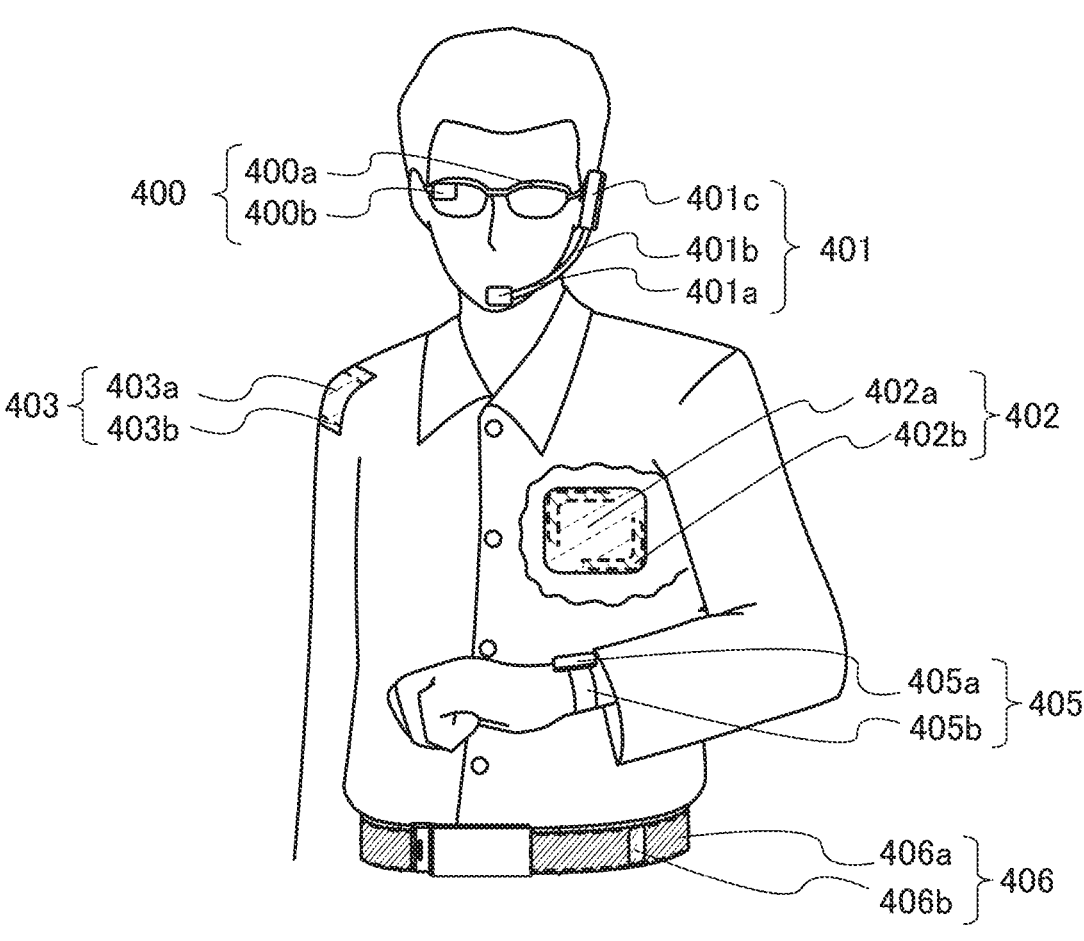
FIGS. 16A and 16B illustrate electronic devices according to one embodiment.

A power storage device described in Embodiment 1 can be provided in wearable devices like those illustrated in FIG. 16A.

For example, the power storage device can be provided in a glasses-type device 400 illustrated in FIG. 16A. The glasses-type device 400 includes a frame 400a and a display part 400b. The power storage device is provided in a temple of the frame 400a having a curved shape, whereby the glasses-type device 400 can have a well-balanced weight and can be used continuously for a long time.

The power storage device can be provided in a headset-type device 401. The headset-type device 401 includes at least a microphone part 401a, a flexible pipe 401b, and an earphone part 401c. The power storage device can be provided in the flexible pipe 401b and the earphone part 401c.

The power storage device can be provided in a device 402 that can be attached directly to a body. A power storage device 402b can be provided in a thin housing 402a of the device 402.

The power storage device can be provided in a device 403 that can be attached to clothes. A power storage device 403b can be provided in a thin housing 403a of the device 403.

The power storage device can be provided in a watch-type device 405. The watch-type device 405 includes a display part 405a and a belt part 405b, and the power storage device can be provided in the display part 405a or the belt part 405b.

The display part 405a can display various kinds of information such as time and reception information of an e-mail or an incoming call.

The watch-type device 405 is a wearable device that is wound around an arm directly; thus, a sensor that measures the pulse, the blood pressure, or the like of the user may be incorporated therein. Data on the exercise quantity and health of the user can be stored to be used for health maintenance.

The power storage device can be provided in a belt-type device 406. The belt-type device 406 includes a belt part 406a and a wireless power feeding and receiving part 406b, and the power storage device can be provided inside the belt part 406a.

Figure 16B:
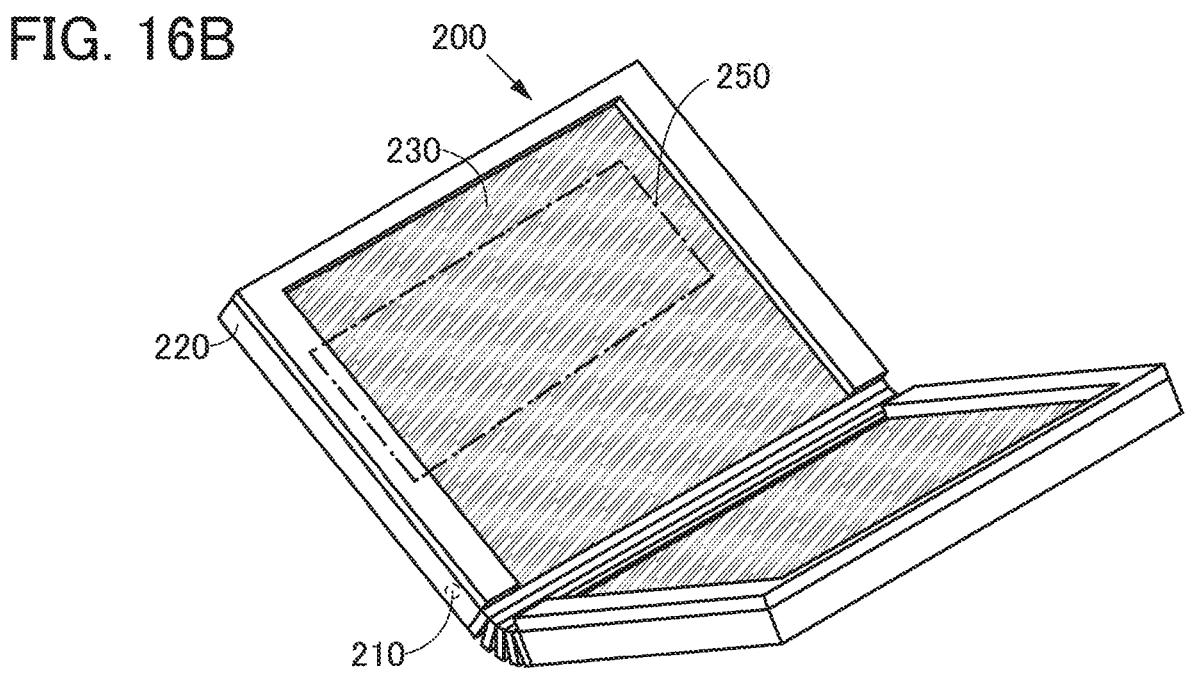

FIG. 16B is a projection view illustrating an example of an external view of an information processing device 200. The information processing device 200 described in this embodiment includes an arithmetic device 210, an input/output device 220, a display portion 230, and a power storage device 250.

The information processing device 200 includes a communication portion having a function of supplying data to a network and acquiring data from the network. Image information may be generated in accordance with received information distributed among a specific space using a communication portion 290. For example, educational materials can be distributed among a classroom and displayed to be used as a school book. Alternatively, materials transmitted among a conference room in a company can be received and displayed.

At least part of this embodiment can be implemented in combination with any of the other embodiments described in this specification as appropriate.

Example 1

In this example, a battery of one embodiment of the present invention was fabricated. Here, the method exemplified in the manufacturing method example 1 of Embodiment 1 was employed.

Six positive electrode current collectors each made of aluminum foil including one surface provided with a layer of a positive electrode active material and six negative electrode current collectors each made of copper foil including one surface provided with a layer of a negative electrode active material were prepared. $LiCoO_2$ and graphite were used as the positive electrode active material and the negative electrode active material, respectively.

The positive electrode current collector was obtained such that, after a pair of positive electrode current collectors was made to overlap with each other with surfaces opposite to the coated surfaces facing each other, the pair of positive electrode current collectors was covered with a bag-like separator.

Figure 17A:
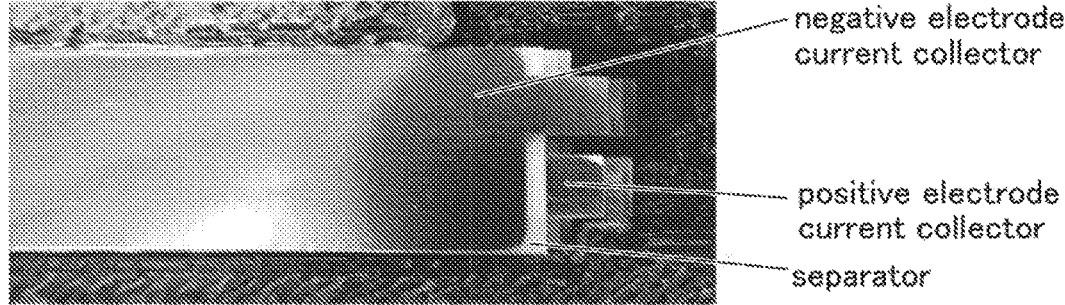
FIGS. 17A to 17C are photographs showing the appearance according to Example 1.
Figure 17B:
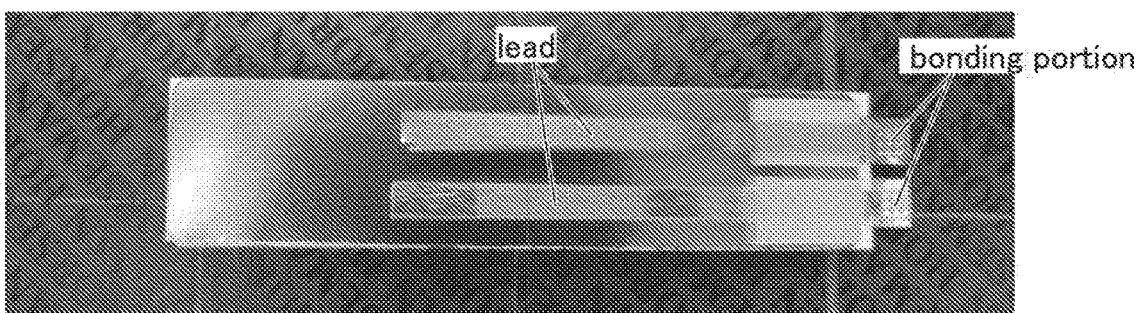
Figure 17C:
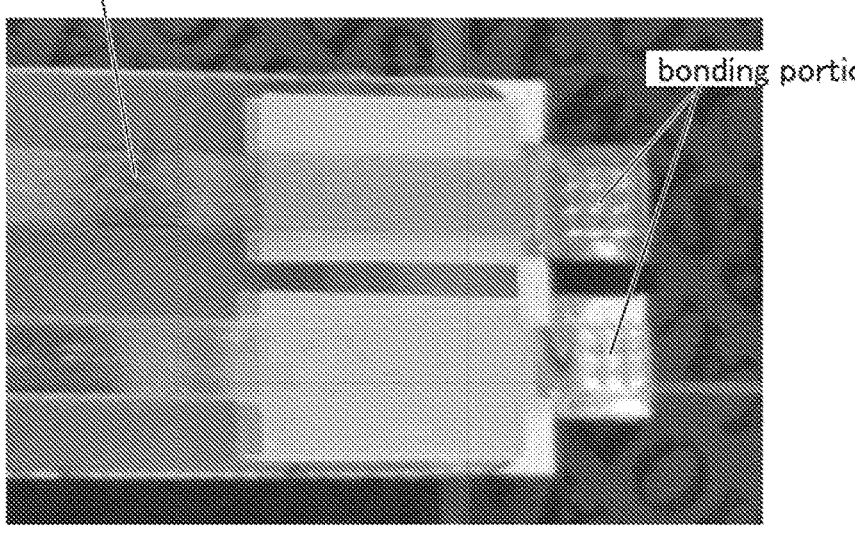

Then, as shown in FIG. 17A, the positive electrode current collectors each covered with the separator and the negative electrode current collectors were stacked such that the positions of the positive electrode current collectors and the negative electrode current collectors were shifted in the length direction. After that, as shown in FIG. 17B, a lead was bonded to each of tab portions of the positive electrode current collectors and the negative electrode current collectors by ultrasonic welding. FIG. 17C is an enlarged view of FIG. 17B.

Figure 18A:
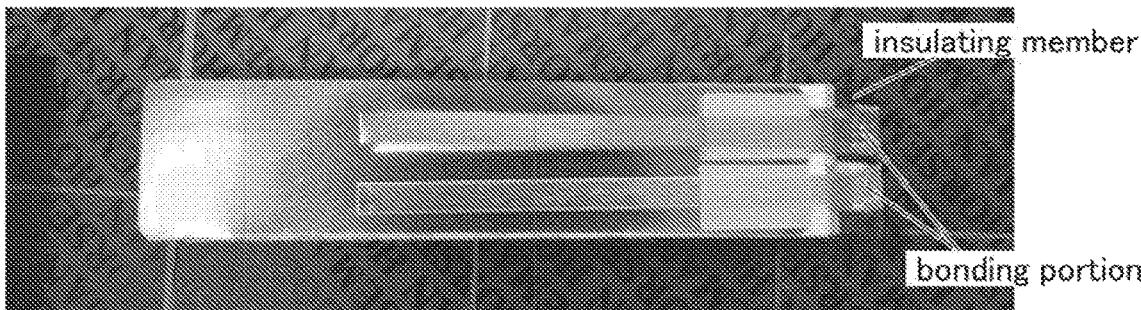
FIGS. 18A to 18C are photographs showing the appearance according to Example 1.
Figure 18B:
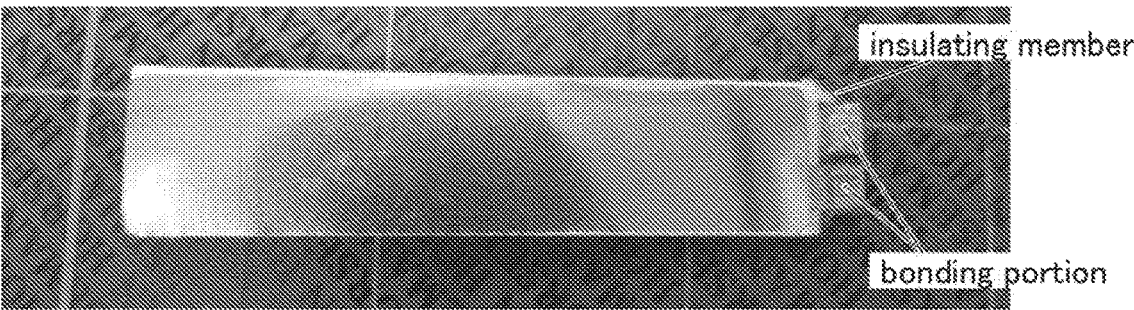
Figure 18C:
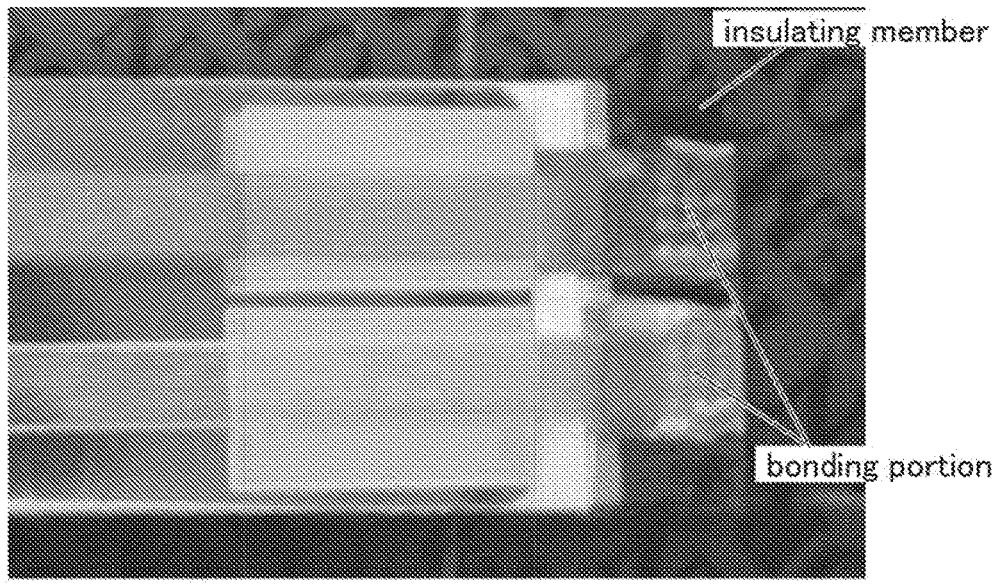

Then, as shown in FIG. 18A, a polyimide tape was wound as an insulating member to cover a pair of bonding portions. FIG. 18B is a photograph of the reverse side, and FIG. 18C is an enlarged view of FIG. 18A.

Figure 19A:
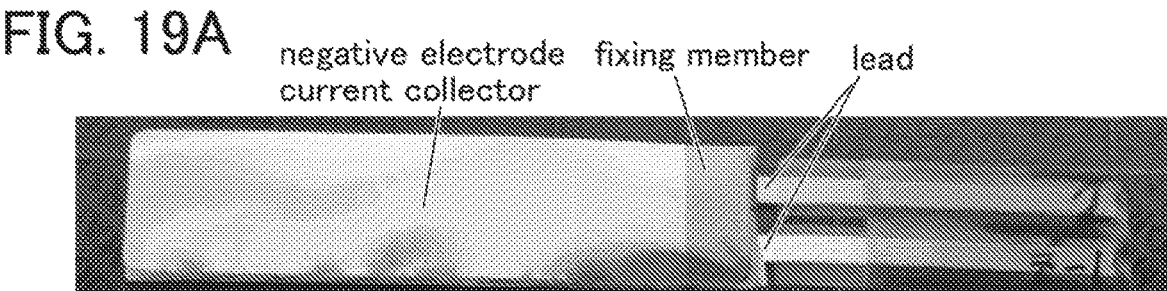
FIGS. 19A to 19C are photographs showing the appearance according to Example 1.
Figure 19B:
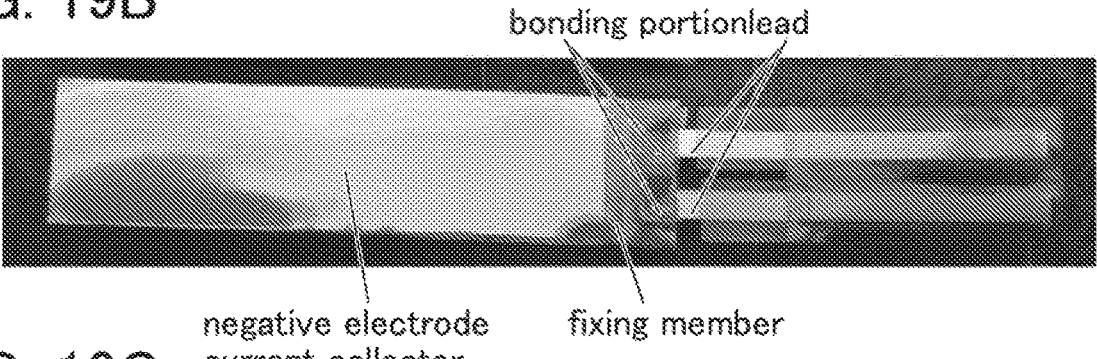
Figure 19C:
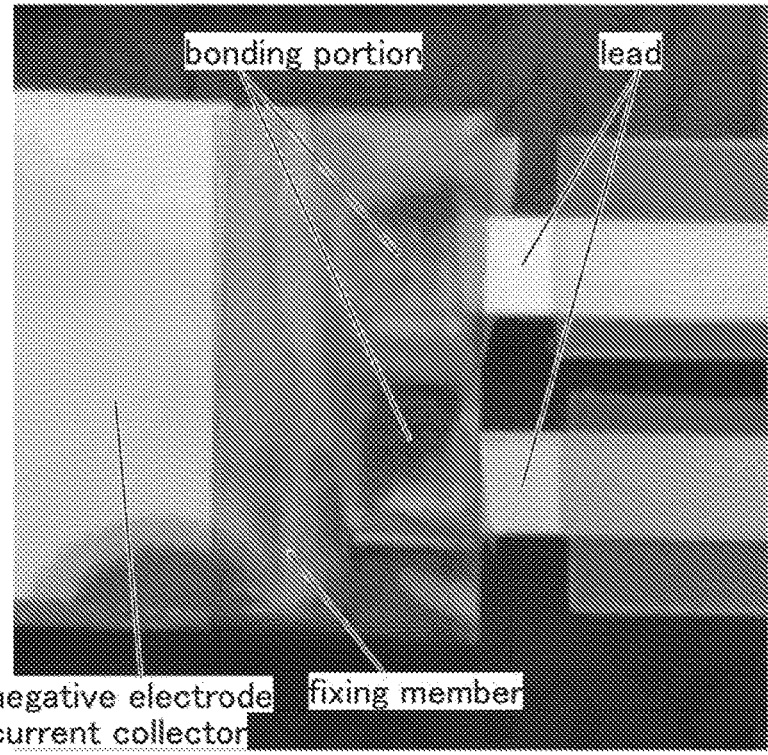

Then, the tab portions of the positive electrode current collectors and the negative electrode current collectors were folded back. Then, as a fixing member, a polyimide tape was wound to fix the pair of tab portions including the bonding portions, the positive electrode current collectors, and the negative electrode current collectors. FIG. 19B is a photograph of the bonding portion side, FIG. 19A is a photograph of the reverse side, and FIG. 19C is an enlarged view of FIG. 19B.

In this manner, the electrode member was completed.

Then, the electrode member was sandwiched by an exterior body, and side seals and a top seal were formed; thus, the battery was fabricated.

As the exterior body, an aluminum laminated film with a thickness of approximately 70 μm in which polypropylene, aluminum foil, and nylon are stacked in this order was used. The film was obtained by being processed to have a wave pitch of 2 mm and a height difference between a crest and a trough of 0.5 mm.

Bonding for formation of seal portions of the film was performed using a mold (heat bar) with a flat surface. For the side seals, a heat bar with a width of 1 mm was used. For the top seal, a heat bar with a width of 2 mm provided with a groove at the position facing a lead portion was used.

Figure 20A:
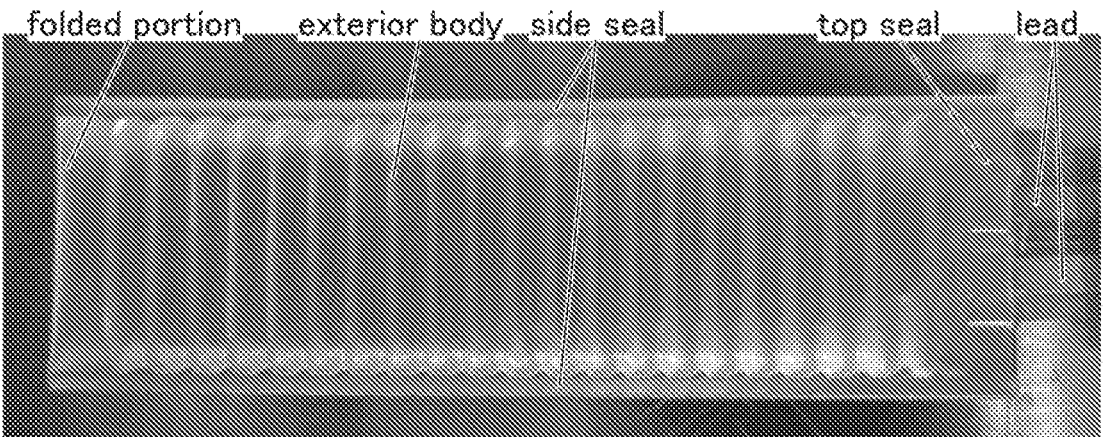
FIGS. 20A and 20B are photographs showing the appearance of a battery according to Example 1.
Figure 20B:
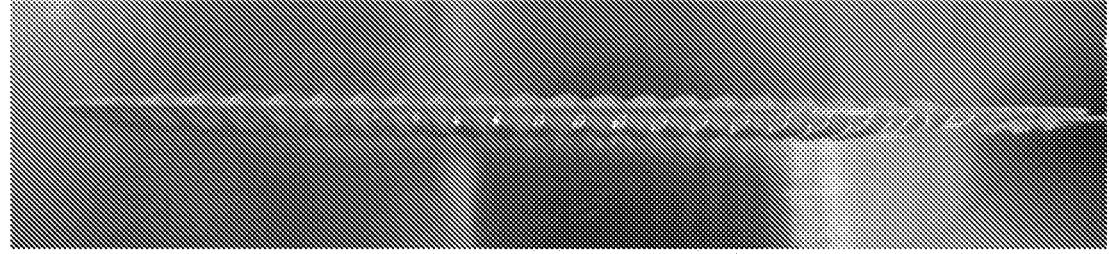

FIGS. 20A and 20B are photographs showing the appearance of the fabricated battery. As shown in FIGS. 20A and 20B, it is confirmed that the top seal and the side seals are extremely flat, and the part of the film changes in shape such that the wave period of a portion close to an end portion of the film is longer than that of a center portion thereof and the wave amplitude of the portion close to the end portion of the film is smaller than that of the center portion thereof.

The above description thus far is Example 1.

At least part of this example can be implemented in combination with any of the embodiments or the other example described in this specification as appropriate.

Example 2

A battery of one embodiment of the present invention and batteries for reference were fabricated, and the results of taking images of inside structures of the batteries and the evaluation results of electrical characteristics of the batteries before and after a repeated bending test are described below.

[Fabrication of Samples]

First, three kinds of samples (Reference sample 1, Reference sample 2, and Sample 1) were fabricated.

Aluminum foil with a width of 9 mm and copper foil with a width of 10 mm were used as a positive electrode current collector and a negative electrode current collector, respectively. In this example, six positive electrode current collectors and six negative electrode current collectors that each include one surface provided with an active material layer were stacked.

Sample 1 was fabricated by a method similar to that described in Example 1. A 16-mm-width aluminum laminated film embossed in advance was used as an exterior body of Sample 1.

Reference sample 1 and Reference sample 2 were each fabricated under conditions where a lead and a current collector were fixed to each other only at a bonding portion. In Reference sample 1 and Reference sample 2, as in Sample 1, aluminum laminated films embossed in advance were used as exterior bodies. As the exterior body of Reference sample 1, a 15-mm-width aluminum laminated film was used. As the exterior body of Reference sample 2, a 16-mm-width aluminum laminated film similar to that of Sample 1 was used.

[Observation of Inside Structure]

The inside of each of the batteries of fabricated Reference sample 2 and Sample 1 was observed by X-ray computed tomography (X-ray CT).

Figure 21A:
FIGS. 21A to 21C are transmission X-ray images of a battery according to Example 2.
Figure 21B:
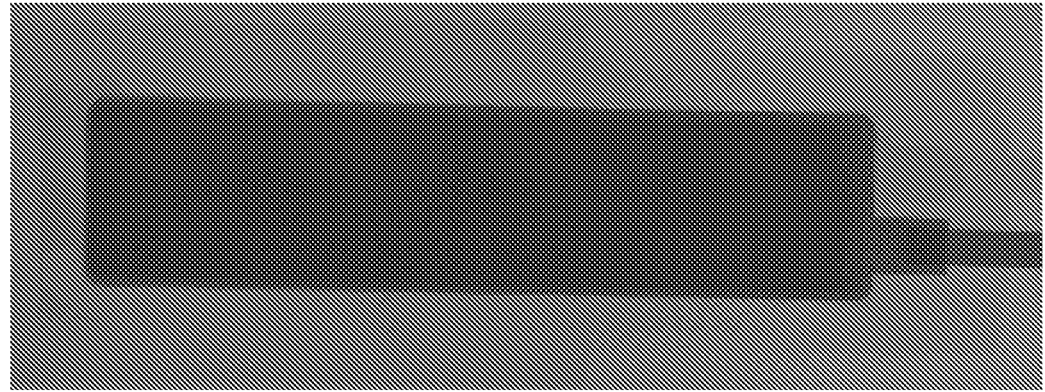
Figure 21C:
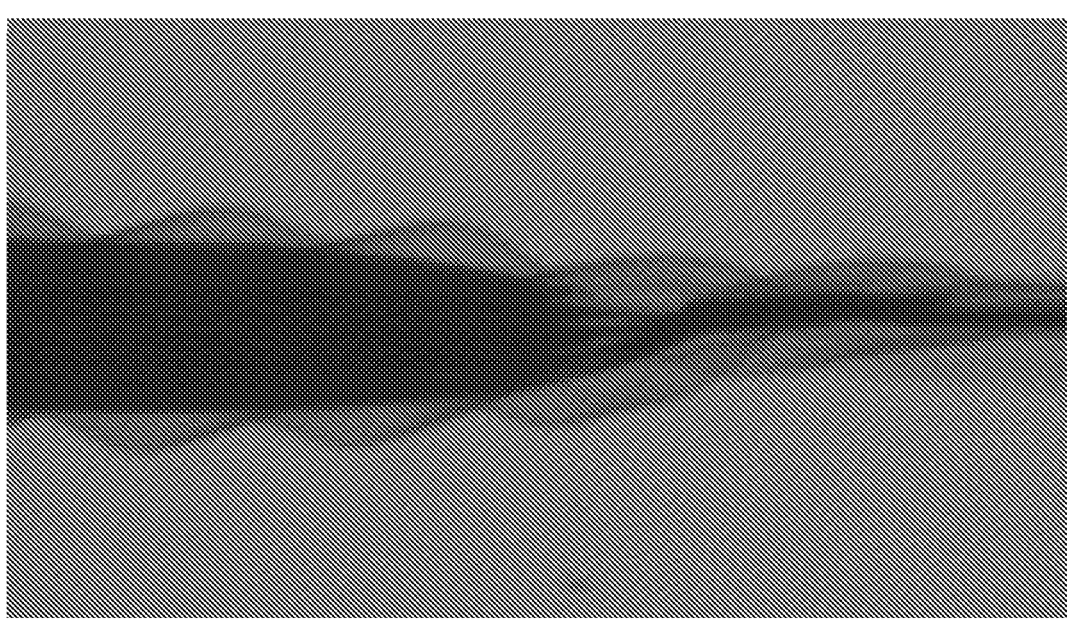

FIGS. 21A to 21C are transmission X-ray photographs of Reference sample 2. FIG. 21A is a photograph in the horizontal direction, FIG. 21B is a photograph in a plan view, and FIG. 21C is an enlarged photograph of a region in the vicinity of a tab portion in FIG. 21A.

In these photographs, the exterior body, the positive electrode current collectors, and the like that are formed of aluminum foil appear transparent because a lighter element transmits X-rays more easily.

As shown in FIG. 21C, a bonding portion where a lead and a tab are bonded to each other is provided in the position apart from a portion where regions provided with the active material layers of the current collectors are stacked.

Figure 22A:
FIGS. 22A to 22C are transmission X-ray images of a battery according to Example 2.
Figure 22B:
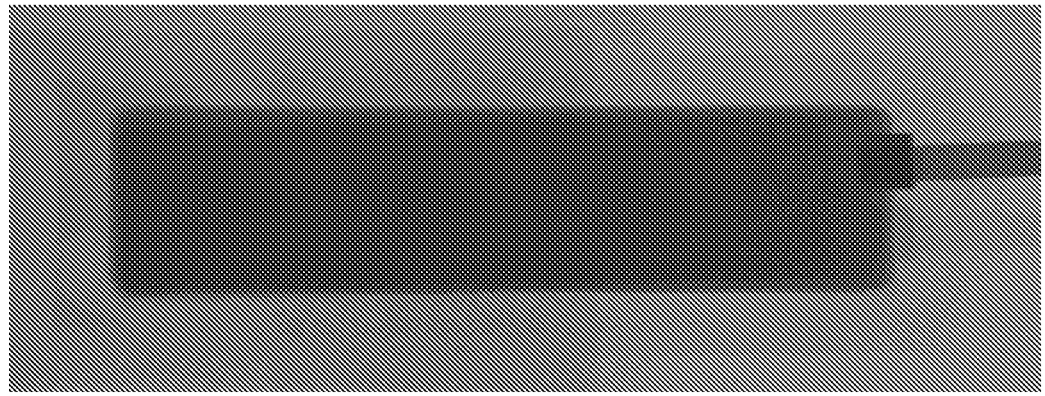
Figure 22C:
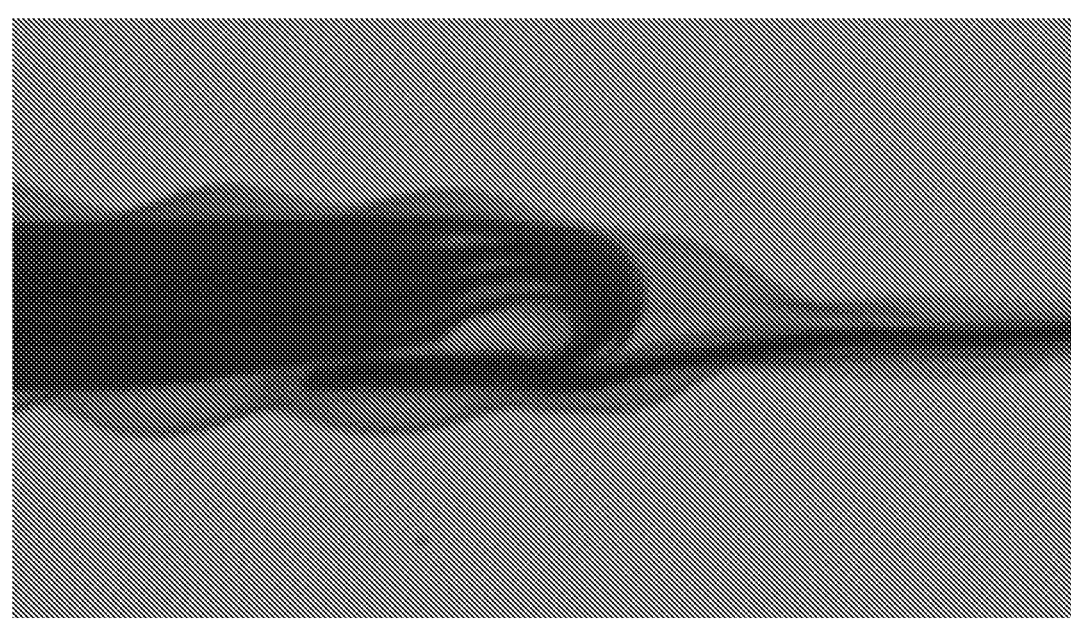

FIGS. 22A to 22C are transmission X-ray photographs of Sample 1. As shown in FIG. 22C, tab portions of the current collectors are folded back. Furthermore, it is confirmed that the bonding portion where the current collector and the lead are bonded to each other overlaps with a portion where the current collectors are stacked.

Note that the drawing of Reference sample 1 is not shown because Reference sample 1 is different from Reference sample 2 only in the width of the exterior body.

[Bending and Unbending Test]

The bending and unbending test was repeatedly performed on Reference sample 1, Reference sample 2, and Sample 1. As the bending and unbending test, bending with a curvature radius of 25 mm and unbending were repeated.

In Reference sample 1, damage to the exterior body and leakage of the electrolyte solution were observed after the bending and unbending test was performed 6000 times. The damaged part of the exterior body of Reference sample 1 was positioned in a portion where the exterior body was in contact with the end portion of the negative electrode current collector.

In contrast, in Reference sample 2 and Sample 1, damage to the exterior body and leakage of the electrolyte solution were not observed even after the bending and unbending test was performed 10000 times.

[Observation 1 of Inside Structure]

Figure 23A:
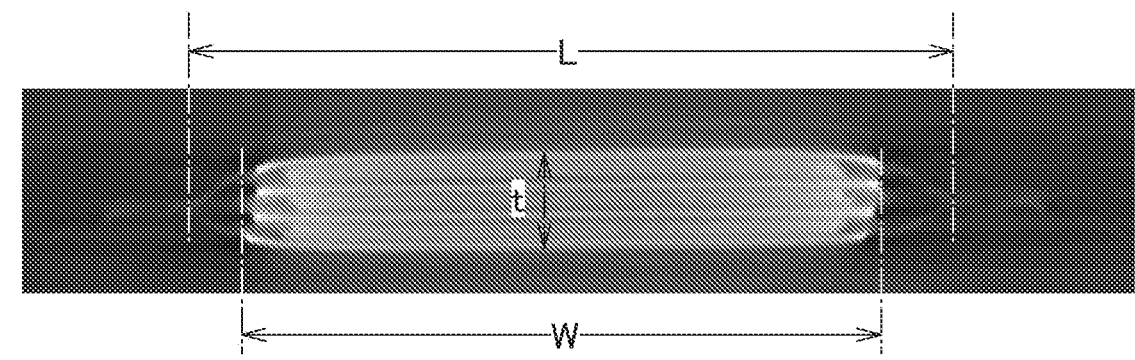
FIGS. 23A to 23C are X-ray CT images of batteries according to Example 2.
Figure 23B:
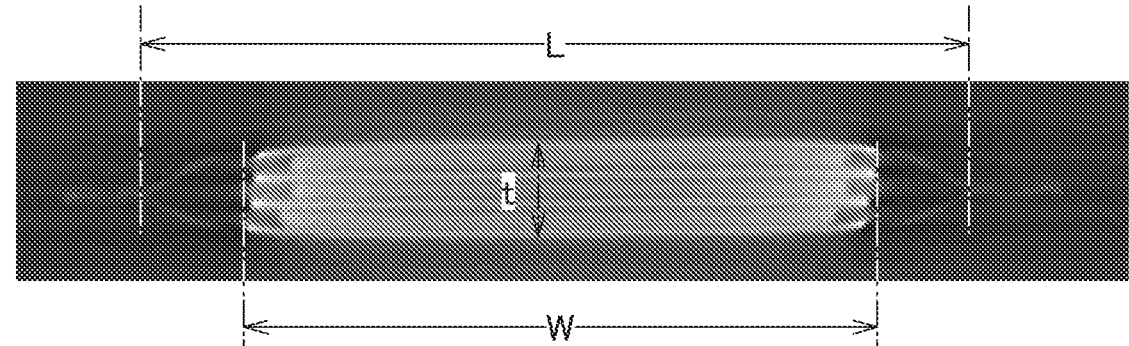
Figure 23C:
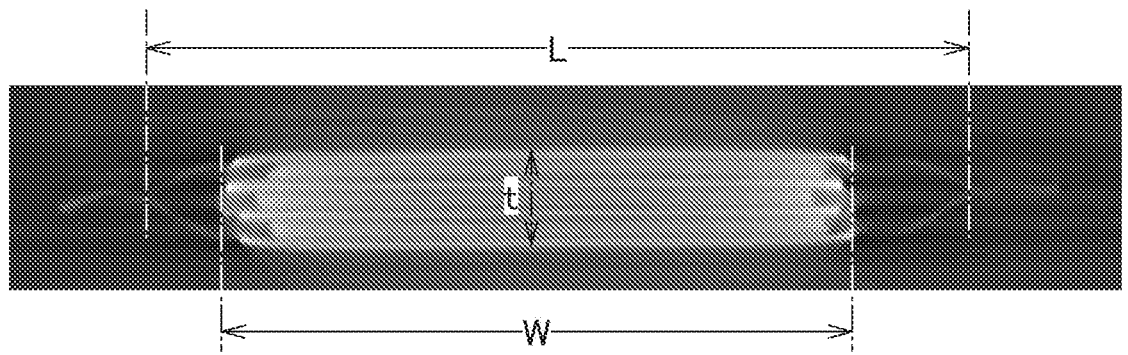

FIGS. 23A to 23C are X-ray CT images of cross sections of the samples before the bending and unbending test. FIG. 23A shows the cross section along the trough line of the exterior body of Reference sample 1; FIG. 23B, Reference sample 2; and FIG. 23C, Sample 1.

At this time, the value of a in Formula (2) was estimated. In Formula (2), L represents the distance between the pair of side seals, W represents the width of the negative electrode current collector, and t represents the thickness of the electrode member (the distance between two negative electrode current collectors positioned on the outer side).

[Formula 2]

$$a = \frac{L - W}{2t} \qquad (2)$$

The estimated value of a of Reference sample 1 was 0.66. The estimated value of a of Reference sample 2 was 1.04. The estimated value of a of Sample 1 was 1.03.

The above results show that, in Reference sample 1, the width of space between each of the end portions of the negative electrode current collector and the side seal was less than 0.7 times as large as the thickness. The bending and unbending test results show that, in Reference sample 1, the end portion of the negative electrode current collector came in contact with the exterior body and the exterior body was damaged; accordingly, it is revealed that space with such a width is not enough.

In Reference sample 2 and Sample 1, the width of space between each of the end portions of the negative electrode current collector and the side seal was 0.8 times or more as large as the thickness. In the bending and unbending test results, damage was not observed even after the test was repeated 10000 times; accordingly, it is shown that the space therebetween is sufficiently ensured.

[Charge and Discharge Characteristics]

Charge and discharge characteristics of the samples before and after the bending and unbending test were measured.

Figure 24A:
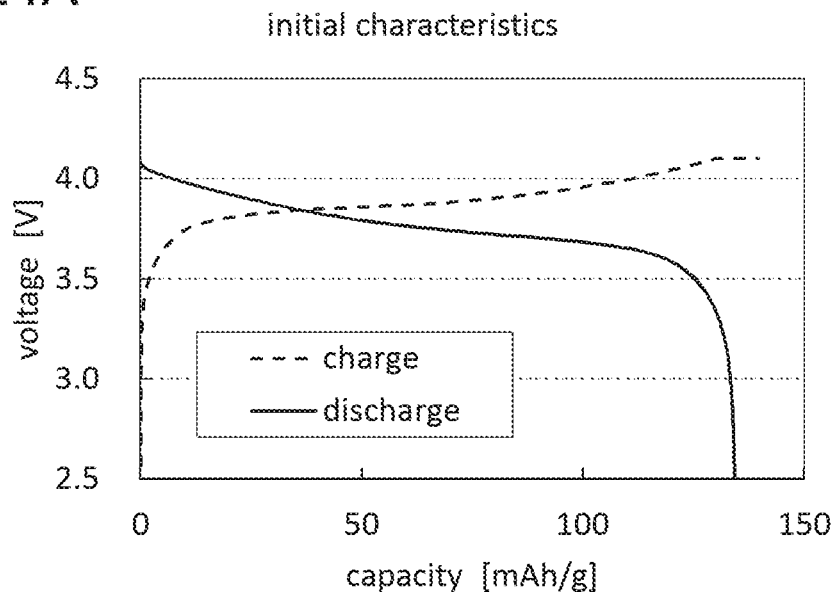
Figure 24A:
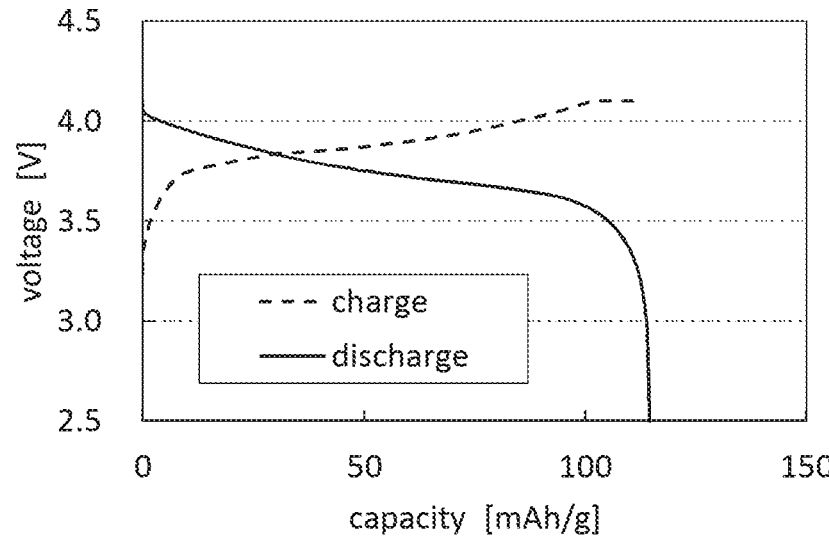

The characteristics of Reference sample 1 are shown in FIGS. 24A and 24B. FIG. 24A shows the characteristics before the bending and unbending test is performed, and FIG. 24B shows the characteristics after the bending and unbending test is performed 3000 times. In each of the drawings, the vertical axis represents voltage and the horizontal axis represents capacity per unit weight of the positive electrode active material. As shown in FIGS. 24A and 24B, a decrease in the capacity by the bending and unbending test was confirmed.

Figures 25A, 25B:
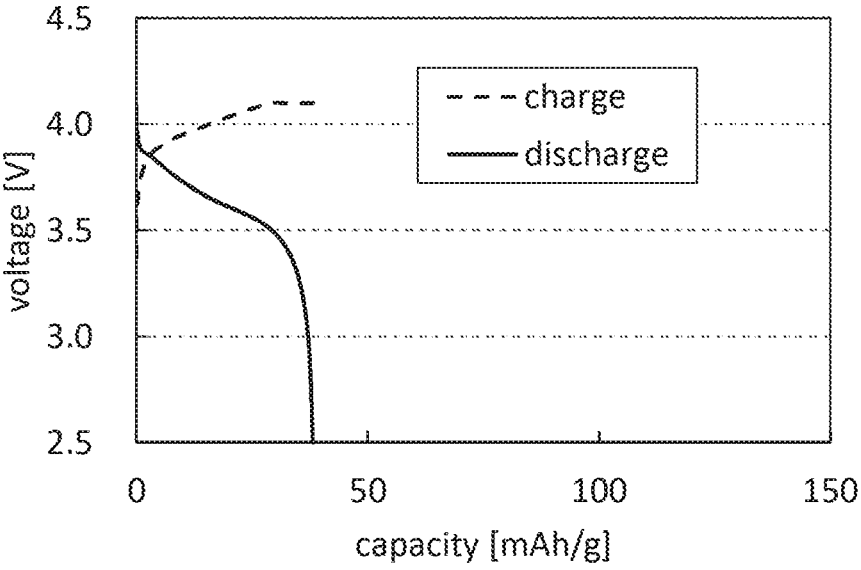
FIGS. 25A and 25B show charge and discharge characteristics of a battery according to Example 2.

The characteristics of Reference sample 2 are shown in FIGS. 25A and 25B. FIG. 25B shows the characteristics after the bending and unbending test is performed 10000 times. As shown in FIGS. 25A and 25B, a decrease in the capacity by the bending and unbending test was confirmed, though damage to the exterior body was not observed.

Figure 26A:
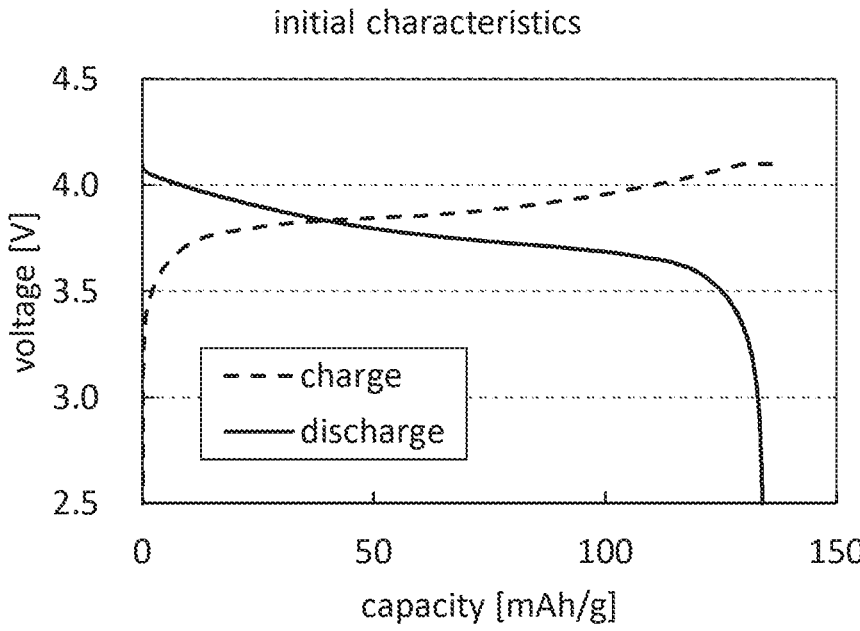
FIGS. 26A and 26B show charge and discharge characteristics of a battery according to Example 2.
Figure 26B:
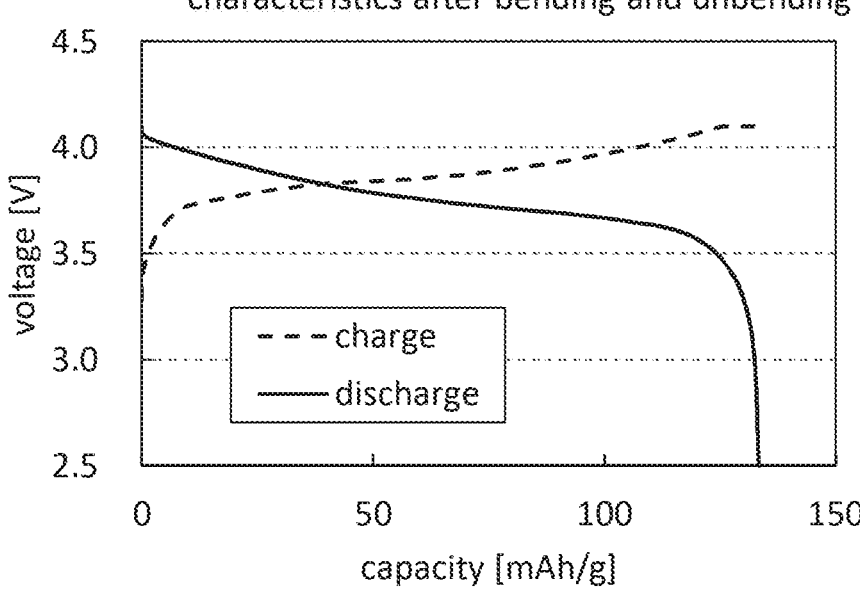

The characteristics of Sample 1 are shown in FIGS. 26A and 26B. FIG. 26B shows the characteristics after the bending and unbending test is performed 10000 times. In Sample 1, a decrease in the capacity was hardly observed when the characteristics before and after the bending and unbending test were compared. The discharge capacity before the bending and unbending test was 134.0 [mAh/g], whereas the discharge capacity after the bending and unbending test was 133.3 [mAh/g].

[Observation 2 of Inside Structure]

Transmission X-ray photographs of Reference sample 2 and Sample 1 were taken again after the bending and unbending test was performed 10000 times, and the inside structures were observed.

Figure 27A:
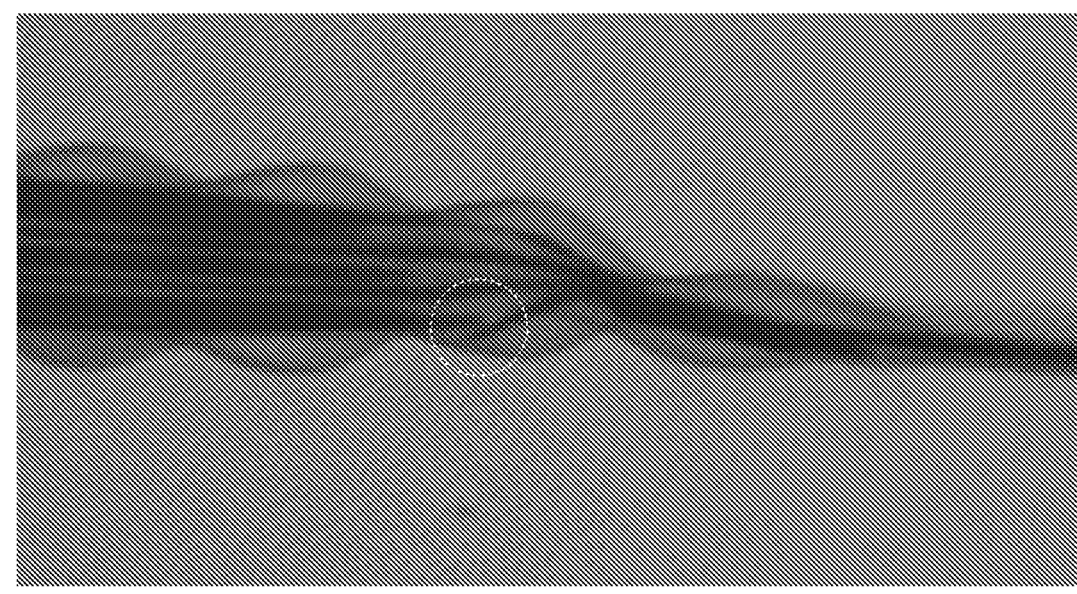
FIGS. 27A and 27B are transmission X-ray images of batteries according to Example 2.

FIG. 27A is a transmission X-ray photograph of a region in the vicinity of the tab portions of Reference sample 2 in the horizontal direction. As shown in the portion surrounded by the dashed line in the drawing, a fracture was observed in the part of the negative electrode current collector. This suggests that the decrease in capacity is due to the fracture of the tab portion.

Figure 27B:
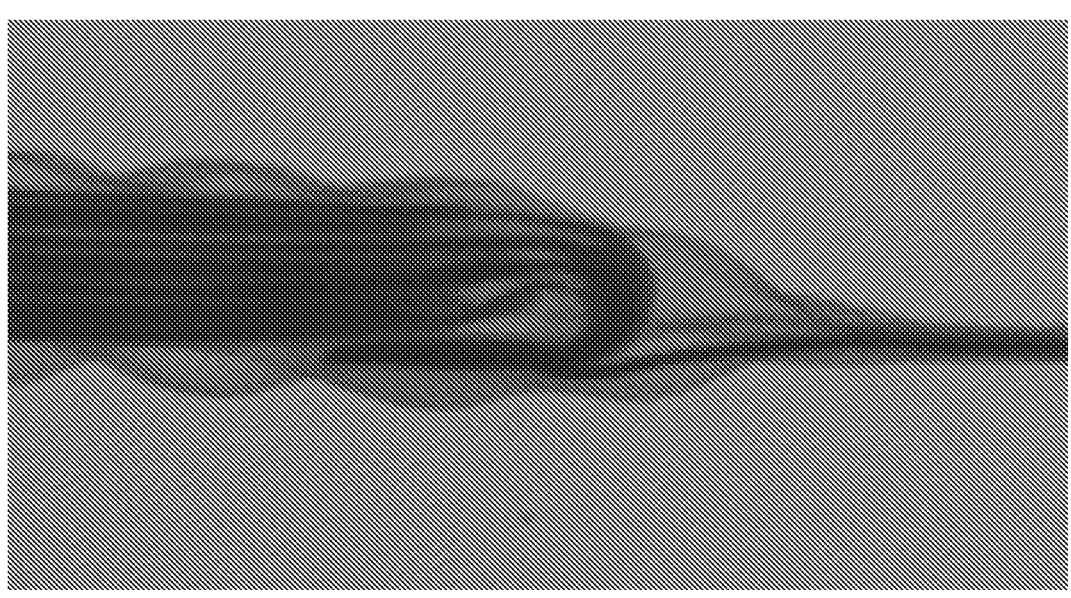

FIG. 27B is a transmission X-ray photograph of a region in the vicinity of the tab portion of Sample 1 in the horizontal direction. It is shown that little change was observed when the transmission X-ray photograph is compared with the transmission-X-ray photograph before the bending and unbending test (FIG. 22C).

The above results show that the battery of one embodiment of the present invention is a highly reliable battery in which a decrease in capacity is hardly observed even after bending and unbending are repeated.

The above description thus far is Example 2.

At least part of this example can be implemented in combination with any of the embodiments and the other example described in this specification as appropriate.

This application is based on Japanese Patent Application serial no. 2016-123209 filed with Japan Patent Office on Jun. 22, 2016, the entire contents of which are hereby incorporated by reference.

What is claimed is:

1. A battery comprising:
   a first lead;

a second lead;

a first current collector;

a second current collector; and an exterior body enclosing the first current collector and the second current collector, wherein each of the first current collector and the second current collector is one conductive film, wherein the first current collector includes a first portion not coated with a first active material and a second portion coated with the first active material, wherein the first current collector has the first portion in a first direction extending to a first side of the exterior body, wherein the second current collector includes a third portion not coated with a second active material and a fourth portion coated with the second active material, wherein the second current collector has the third portion in the first direction extending to the first side of the exterior body, wherein the first lead is bonded to the first portion so that the first lead extends in the first direction, wherein the second lead is bonded to the third portion so that the second lead extends in the first direction, wherein the first portion has one fold and the first lead has no fold in an inside of the exterior body so that the first lead, the second portion, the fourth portion, and a part of the first portion overlap each other in a portion and the first lead penetrates out of the exterior body from the first side, and wherein the third portion has one fold and the second lead has no fold in the inside of the exterior body so that the second lead, the second portion, the fourth portion, and a part of the third portion overlap each other in a portion and the second lead penetrates out of the exterior body from the first side.

2. The battery according to claim 1, further comprising:

an insulating fixing member, wherein the first lead, the first current collector, and the second current collector are fixed by the insulating fixing member in a portion where the first lead, the first current collector, and the second current collector overlap each other, and wherein the second lead, the first current collector, and the second current collector are fixed by the insulating fixing member in a portion where the second lead, the first current collector, and the second current collector overlap each other.

3. The battery according to claim 1, wherein the first current collector is folded back between the second portion and a bonding portion of the first portion to the first lead, wherein the first lead, the first portion, and the second portion overlap each other in a portion, wherein the second current collector is folded back between the fourth portion and a bonding portion of the third portion to the second lead, and wherein the second lead, the third portion, and the fourth portion overlap each other in a portion.

4. The battery according to claim 3, wherein the first current collector is folded back such that a surface of the first current collector faces outward, the surface of the first current collector being bonded to the first lead, and wherein the second current collector is folded back such that a surface of the second current collector faces outward, the surface of the second current collector being bonded to the second lead.

5. The battery according to claim 3, further comprising:

a first insulating member; and a second insulating member, wherein the part of the first portion and the second portion overlap each other with the first insulating member positioned therebetween, and wherein the part of the third portion and the fourth portion overlap each other with the second insulating member positioned therebetween.

6. The battery according to claim 5, wherein the first insulating member covers the first portion and the first lead, and wherein the second insulating member covers the third portion and the second lead.

7. The battery according to claim 1, wherein the exterior body has a film-like shape and is folded in two such that the first current collector and the second current collector are sandwiched by the exterior body, wherein the exterior body includes a pair of first seal portions by which the first current collector and the second current collector are sandwiched and a second seal portion overlapping with the first lead and the second lead, and wherein the exterior body has a wave shape almost parallel to the second seal portion in a region overlapping with the first current collector and the second current collector.

8. The battery according to claim 7, wherein the first seal portions and the second seal portion are flat without the wave shape.

9. The battery according to claim 7, wherein a distance between each of the first seal portions and an end portion of the first current collector or an end portion of the second current collector is 0.8 times or more and 3.0 times or less as large as a thickness of a stack including the first current collector and the second current collector.

10. The battery according to claim 7, wherein a difference between a distance between the pair of first seal portions and a width of the first current collector or a width of the second current collector is 1.6 times or more and 6.0 times or less as large as a thickness of a stack including the first current collector and the second current collector.

11. A battery comprising:

a plurality of positive electrodes each comprising:

a current collector comprising a first portion and a second portion; and an active material layer over the second portion;

a positive electrode lead electrically connected to the plurality of positive electrodes; and an exterior body enclosing the plurality of positive electrodes, wherein each of the current collectors is one conductive film, wherein each the active material layer is not arranged over the first portion in the plurality of positive electrodes, wherein each of the plurality of positive electrodes has the first portion in a first direction extending to a first side of the exterior body, wherein the plurality of positive electrodes are stacked each interposing a negative electrode and a separator, wherein the first portion of one of the plurality of positive electrodes comprises a bonding portion to the positive electrode lead, wherein the positive electrode lead penetrates out of the exterior body from the first side, and wherein the first portions of the plurality of positive electrodes have one fold to fold back in a direction opposite from the first direction and the positive electrode lead has no fold in an inside of the exterior body so that the bonding portion and the second portions of the plurality of positive electrodes overlap each other.

12. The battery according to claim 11, wherein a tip of the first portion and the second portions of the plurality of positive electrodes overlap each other.

13. The battery according to claim 12, further comprising: a first insulating member interposed between the tip of the first portion and the second portions of the plurality of positive electrodes.

14. The battery according to claim 11, further comprising: an insulating fixing member, wherein the exterior body further encloses a part of the positive electrode lead and the insulating fixing member, and wherein the insulating fixing member positions, the bonding portion, and the second portions of the plurality of positive electrodes overlap each other.

15. The battery according to claim 14, wherein one end of the positive electrode lead is configured to be covered with the insulating fixing member, and wherein the other end of the positive electrode lead positions outside the exterior body.

* * * * *